US008224392B2

(12) United States Patent
Kim et al.

(10) Patent No.: US 8,224,392 B2
(45) Date of Patent: Jul. 17, 2012

(54) MOBILE TERMINAL CAPABLE OF RECOGNIZING FINGERNAIL TOUCH AND METHOD OF CONTROLLING THE OPERATION THEREOF

(75) Inventors: Jong Hwan Kim, Seoul (KR); Seung Hwan Yoo, Seoul (KR); Doo Hwan Kim, Seoul (KR); Mi Jung Kim, Seoul (KR); Soo Chul Lim, Seoul (KR); Young Sun Lee, Seoul (KR); Eun Sang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 12/769,422

(22) Filed: Apr. 28, 2010

(65) Prior Publication Data

US 2010/0279738 A1  Nov. 4, 2010

(30) Foreign Application Priority Data

Apr. 29, 2009 (KR) .................. 10-2009-0037766
Jul. 1, 2009 (KR) .................. 10-2009-0059700
Oct. 5, 2009 (KR) .................. 10-2009-0094365
Oct. 26, 2009 (KR) .................. 10-2009-0101904

(51) Int. Cl.
*H04M 1/00* (2006.01)
*H04B 1/38* (2006.01)
*G06F 3/041* (2006.01)

(52) U.S. Cl. ........................ 455/566; 345/173
(58) Field of Classification Search .................. 455/566, 455/550.1, 90.1, 90.2, 90.3, 145, 154.2, 158.4, 455/158.5; 345/173, 156, 163, 177
See application file for complete search history.

(56) References Cited

U.S. PATENT DOCUMENTS

| 6,380,923 B1 | 4/2002 | Fukumoto et al. |
| 2008/0158170 A1 | 7/2008 | Herz et al. |
| 2008/0316181 A1 | 12/2008 | Nurmi |

*Primary Examiner* — Eugene Yun
(74) *Attorney, Agent, or Firm* — Birch, Stewart, Kolasch & Birch, LLP

(57) ABSTRACT

A method of controlling a mobile terminal, and which includes displaying, on a touch screen display of the mobile terminal, an operation screen corresponding to a current operating mode executing on the mobile terminal; detecting, via a detecting device, a touch input on the touch screen display of the mobile terminal; determining, via a controller on the mobile terminal, a first finger characteristic describing a finger touching the touch screen display and a second finger characteristic describing the finger touching the touch screen display that is different than the first finger characteristic; performing, via the controller, a first operation relevant to the current operating mode based on the determined first finger characteristic; and performing, via the controller, a second operation relevant to the current operating mode based on the determined second finger characteristic.

10 Claims, 28 Drawing Sheets

FIG. 4
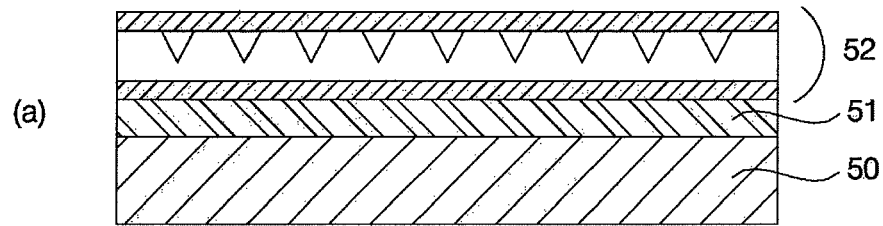
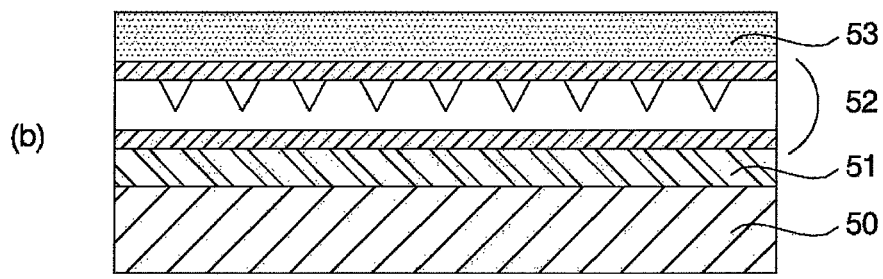
FIG. 5
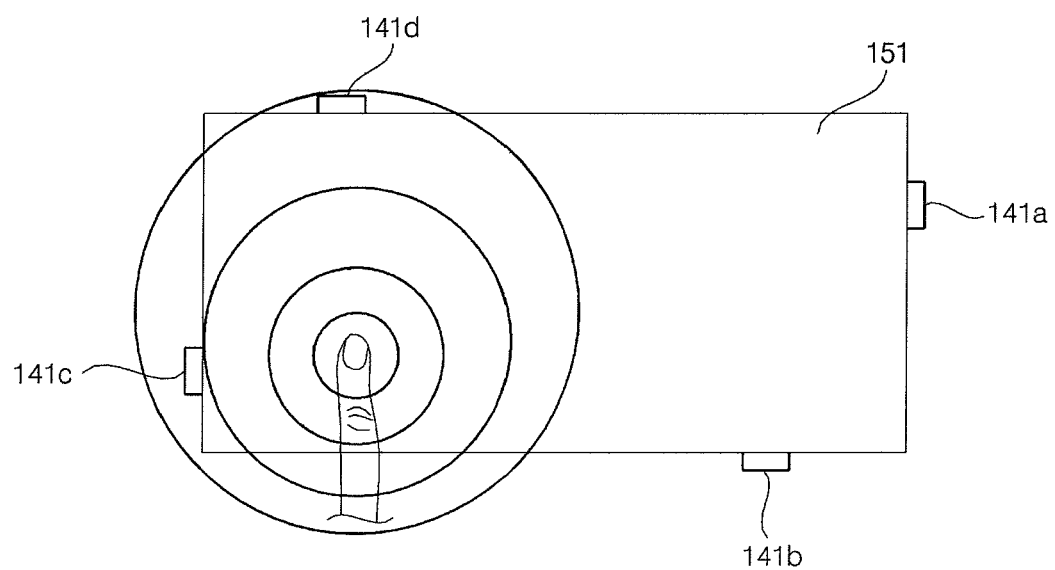

(a)    (b)

(a)    (b)

(a)           (b)

(a)           (b)

(a)  (b)

(a)  (b)

(a) (b)

MOBILE TERMINAL CAPABLE OF RECOGNIZING FINGERNAIL TOUCH AND METHOD OF CONTROLLING THE OPERATION THEREOF

CROSS-REFERENCE TO RELATED APPLICATIONS

This application claims the priority benefit of Korean Patent Application Nos. 10-2009-0037766, 10-2009-0094365, 10-2009-0101904, and 10-2009-0059700 filed on Apr. 29, 2009, Oct. 5, 2009, Oct. 26, 2009, Jul. 1, 2009, respectively, in the Korean Intellectual Property Office, the disclosures of which are incorporated herein by reference.

BACKGROUND OF THE INVENTION

1. Field of the Invention

The present invention relates to a mobile terminal and a method of controlling the operation thereof, in which various operations performed by the mobile terminal can be effectively controlled in response to a fingernail touch.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI (such as a display device or a keypad) of a mobile terminal without compromising the mobility and the portability of a mobile terminal. Therefore, it is necessary to develop ways to control the operation of a mobile terminal using a new data input/output method and thus efficiently use a variety of complicated functions provided by the mobile terminal.

SUMMARY OF THE INVENTION

The present invention provides a mobile terminal and a method of controlling the operation thereof, in which various operations performed by the mobile terminal can be effectively controlled in response to a fingernail touch made by touching a display module of the mobile terminal with a fingernail.

According to an aspect of the present invention, there is provided a method of controlling the operation of a mobile terminal, the method including displaying an operation screen corresponding to a current operating mode on a display module; if an ordinary touch is detected from the display module, performing a first operation relevant to the current operating mode; and if a fingernail touch is detected from the display module, performing a second operation relevant to the current operating mode.

According to another aspect of the present invention, there is provided a mobile terminal including a display module configured to display an operation screen corresponding to a current operating mode; and a controller configured to perform a first operation relevant to the current operating mode if an ordinary touch is detected from the display module, and perform a second operation relevant to the current operating mode if a fingernail touch is detected from the display module.

According to another aspect of the present invention, there is provided a method of controlling the operation of a mobile terminal, the method including storing a plurality of pieces of fingernail information acquired from different fingers; and if a fingernail touch is detected from a display module, performing a first control operation corresponding to one of the plurality of pieces of fingernail information that matches with the detected fingernail touch.

According to another aspect of the present invention, there is provided a mobile terminal including a display module; a memory configured to store a plurality of pieces of fingernail information acquired from different fingers; and a controller, wherein, if a fingernail touch is detected from the display module, the controller performs a first control operation corresponding to one of the plurality of pieces of fingernail information that matches with the detected fingernail touch, and if the fingernail touch is detected from the display module for more than a predefined amount of time, the controller performs a second control operation, which is different from the first control operation.

According to another aspect of the present invention, there is provided a method of controlling the operation of a mobile terminal, the method including storing a plurality of pieces of fingernail information acquired from different fingers; displaying a character input window including a plurality of touch keys on a display module; and if one of the touch keys is selected by a fingernail touch and more than one character can be entered using the selected touch key, entering one of the characters corresponding to one of the plurality of pieces of the fingernail information that matches with the fingernail touch.

According to another aspect of the present invention, there is provided a mobile terminal including a display module configured to display a character input window including a plurality of touch keys; a memory configured to store a plurality of pieces of fingernail information acquired from different fingers; and a controller, wherein, if one of the touch keys is selected by a fingernail touch and more than one character can be entered using the selected touch key, the controller controls one of the characters corresponding to one of the plurality of pieces of the fingernail information that matches with the fingernail touch to be entered.

According to another aspect of the present invention, there is provided a method of controlling the operation of a mobile terminal, the method including preparing a display module capable of recognizing a fingernail touch using both a resistive method and a capacitive method and displaying an operation screen corresponding to a first operating mode on the display module; if a fingernail touch with a predefined pattern is detected from the display module, switching the mobile terminal from the first operating mode to a second operating mode; and if an ordinary touch is detected from the display module, performing an operation relevant to an object selected by the ordinary touch.

According to another aspect of the present invention, there is provided a mobile terminal including a display module configured to be capable of recognizing a fingernail touch using both a resistive method and a capacitive method and display an operation screen corresponding to a first operating mode; and a controller, wherein, if a fingernail touch with a predefined pattern is detected from the display module, the controller switches the mobile terminal from the first operating mode to a second operating mode, and if an ordinary touch is detected from the display module, the controller performs an operation relevant to an object selected by the ordinary touch.

According to another aspect of the present invention, there is provided a method of controlling the operation of a mobile terminal, the method including preparing a display module capable of recognizing a fingernail touch using both a resistive method and a capacitive method and displaying an operation screen including a plurality of objects on the display module; if a fingernail touch is detected from one of the objects, selecting the object from which the fingernail touch is detected; and if an ordinary touch is detected from the display module, performing a predefined operation relevant to the selected object.

According to another aspect of the present invention, there is provided a mobile terminal including a display module configured to be capable of recognizing a fingernail touch using both a resistive method and a capacitive method and display an operation screen including a plurality of objects; and a controller configured to select one of the objects in response to a fingernail touch and perform a predefined operation relevant to the selected object in response to an ordinary touch detected from the display module.

According to another aspect of the present invention, there is provided a method of controlling the operation of a mobile terminal, the method including preparing a display module capable of recognizing a fingernail touch using both a resistive method and a capacitive method and displaying an operation screen including a list of a plurality of items on the display module; if a fingernail touch is detected from a first part of the operation screen, scrolling the list so that a number of items followed by the items currently being displayed on the operation screen can appear on the operation screen; and if a fingernail touch is detected from a second part of the operation screen, scrolling the list so that a number of items following the items currently being displayed on the operation screen can appear on the operation screen.

According to another aspect of the present invention, there is provided a mobile terminal including a display module configured to be capable of recognizing a fingernail touch using both a resistive method and a capacitive method and display an operation screen including a list of a plurality of items; and a controller configured to scroll the list so that a number of items followed by the items currently being displayed on the operation screen can appear on the operation screen if a fingernail touch is detected from a first part of the operation screen, and scroll the list so that a number of items following the items currently being displayed on the operation screen can appear on the operation screen if a fingernail touch is detected from a second part of the operation screen.

According to another aspect of the present invention, there is provided a method of controlling the operation of a mobile terminal, the method including preparing a display module capable of recognizing a fingernail touch using both a resistive method and a capacitive method and displaying a character input window including a plurality of touch keys on the display module; if one of the touch keys is selected by an ordinary touch and more than one character can be entered using the selected touch key, entering one of the characters corresponding to a first input mode; and if one of the touch keys is selected by a fingernail touch and more than one character can be entered using the selected touch key, entering one of the characters corresponding to a second input mode.

According to another aspect of the present invention, there is provided a mobile terminal including a display module configured to be capable of recognizing a fingernail touch using both a resistive method and a capacitive method and display a character input window including a plurality of touch keys; and a controller, wherein, if one of the touch keys is selected by an ordinary touch and more than one character can be entered using the selected touch key, the controller controls one of the characters corresponding to a first input mode to be entered, and if one of the touch keys is selected by a fingernail touch and more than one character can be entered using the selected touch key, the controller controls one of the characters corresponding to a second input mode to be entered.

According to another aspect of the present invention, there is provided a method of controlling the operation of a mobile terminal, the method including preparing a display module capable of recognizing a fingernail touch using both a resistive method and a capacitive method and displaying an operation screen including a plurality of objects on the display module; if a fingernail touch and drag is detected from the operation screen, deleting one of the objects selected by the fingernail touch; and if an ordinary touch and drag is detected from the operation screen, moving the operation screen by an amount corresponding to a distance of the drag.

According to another aspect of the present invention, there is provided a mobile terminal including a display module configured to be capable of recognizing a fingernail touch using both a resistive method and a capacitive method and display an operation screen including a plurality of objects; and a controller, wherein, if a fingernail touch and drag is detected from the operation screen, the controller deletes one of the objects selected by the fingernail touch, and if an ordinary touch and drag is detected from the operation screen, the controller moves the operation screen by an amount corresponding to a distance of the drag.

According to another aspect of the present invention, there is provided a method of controlling the operation of a mobile terminal, the method including preparing a display module capable of recognizing a fingernail touch using both a resistive method and a capacitive method and displaying an operation screen on the display module; if a fingernail touch and drag is detected from the operation screen, drawing a line on the operation screen along a direction of the drag; and if an ordinary touch and drag is detected from the operation screen, moving the operation screen by an amount corresponding to a distance of the drag.

According to another aspect of the present invention, there is provided a mobile terminal including a display module configured to be capable of recognizing a fingernail touch using both a resistive method and a capacitive method and display an operation screen; and a controller, wherein, if a fingernail touch and drag is detected from the operation screen, the controller controls a line to be drawn on the operation screen along a direction of the drag, and if an ordinary touch and drag is detected from the operation screen, the controller moves the operation screen by an amount corresponding to a distance of the drag.

BRIEF DESCRIPTION OF THE DRAWINGS

The above and other features and advantages of the present invention will become more apparent by describing in detail preferred embodiments thereof with reference to the attached drawings in which:

FIGS. 4 and 5 illustrate a display module capable of receiving a fingernail touch, which can be used in the mobile terminal shown in FIG. 1 according to an embodiment of the present invention;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
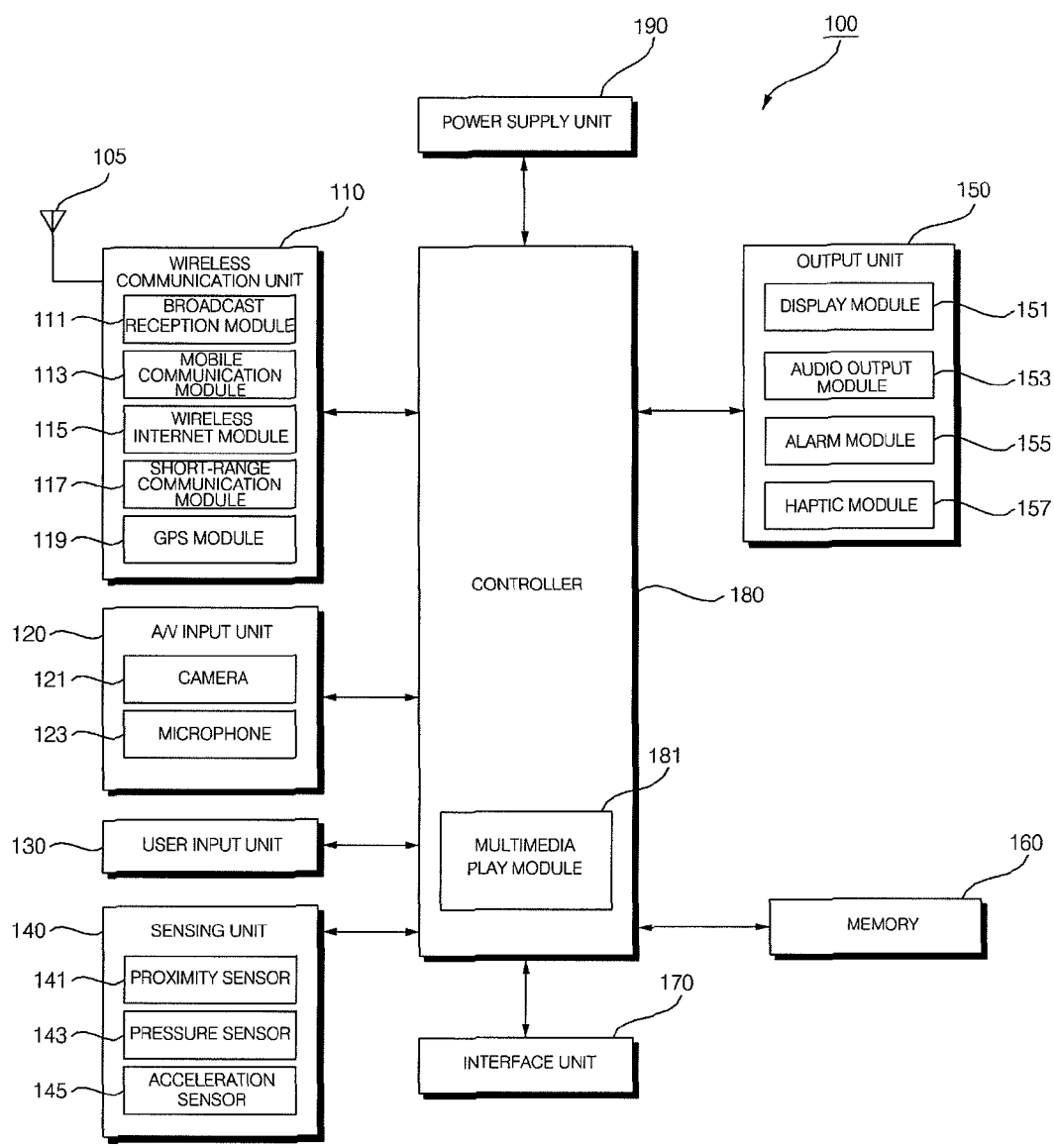
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input module 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and an acceleration sensor 145. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate an ordinary touch from a pressure touch, which is generated using a higher pressure level than that used to generate an ordinary touch, based on data provided by the pressure sensor 143. In addition, when a pressure touch is detected from the display module 151, it is possible to determine the level of pressure applied to the display module 151 upon the detection of a pressure touch based on data provided by the pressure sensor 143.

The acceleration sensor 145 is a type of device for converting a vibration in acceleration into an electric signal.

With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. When an ordinary touch is detected from the touch screen panel, the touch screen panel may transmit a number of signals corresponding to the touch input to the touch screen panel controller. The touch screen panel controller may process the signals transmitted by the touch screen panel, and may transmit the processed signals to the controller 180. Then, the controller 180 may determine whether the touch screen panel has been touched, and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
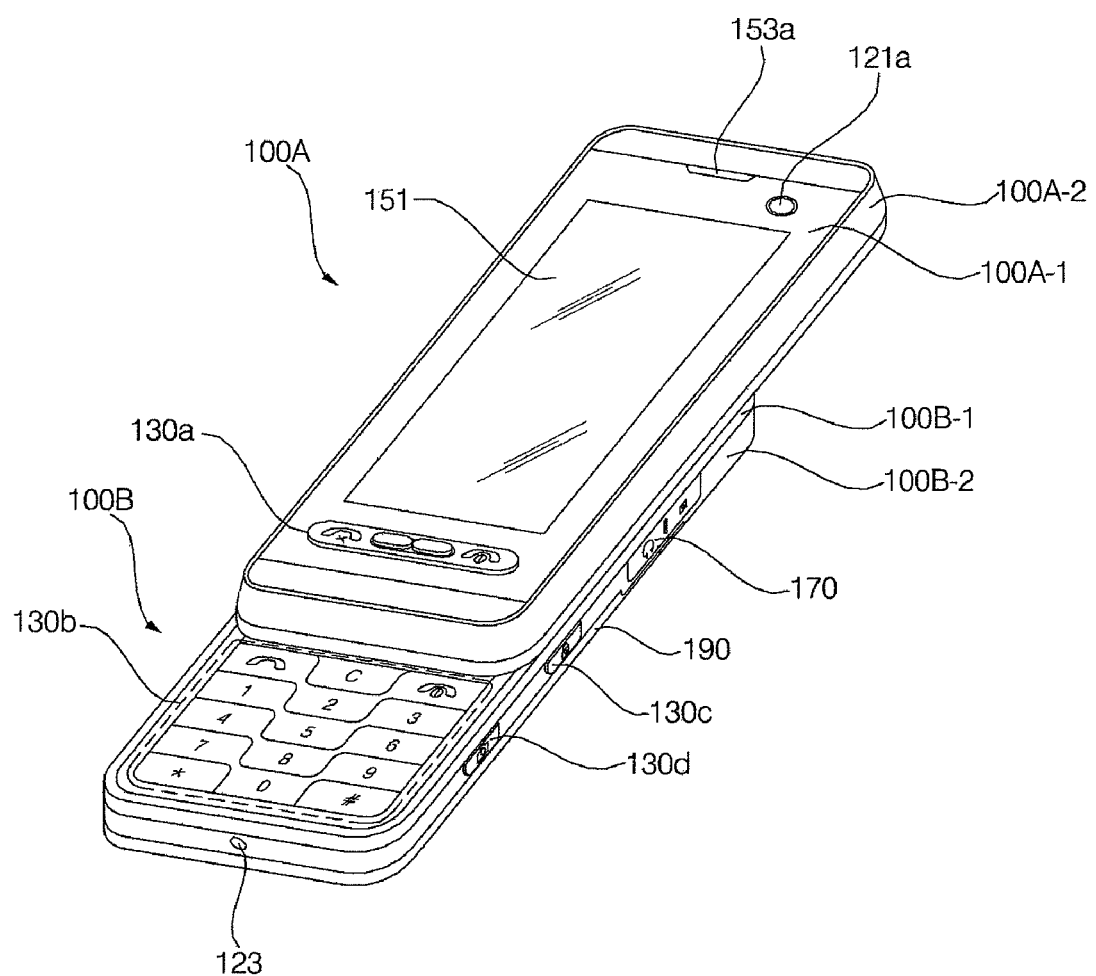
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, a first camera 121a and a first user input module 130a may be disposed in the front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The exterior of the second body 100B may be defined by a second front case 100B-1 and a second rear case 100B-2. A second user input module 130b may be disposed in the second body 100B, and particularly, at the front of the second front case 100B-1. Third and fourth user input modules 130c and 130d, the microphone 123 and the interface unit 170 may be provided in the second front case 100B-1 or the second rear case 100B-2.

The first through fourth user input modules 130a through 130d may be collectively referred to as the user input unit 130. The user input unit 130 may adopt various manipulation methods as long as it can offer tactile feedback to the user.

The first user input module 130a may allow the user to input various commands such as 'start', 'end', and 'scroll' to the mobile terminal 100, the second user input module 130b may be used to input various numerals, characters or symbols, and the third and fourth user input modules 130c and 130d may be used as hot keys for activating certain functions of the mobile terminal 100.

The microphone 123 may be configured to properly receive the user's voice or other sounds.

The interface unit 170 may serve as a path for exchanging data with an external device. For example, the interface unit 170 may include at least one of a connection port for connecting the mobile terminal 100 wirelessly or through wire to an earphone, a port for performing short-rage communication and a port for supplying power to the mobile terminal 100. Alternatively, the interface unit 170 may include a card socket for accommodating an exterior card such as a SIM/UIM card or a memory card for storing data.

Figure 3:
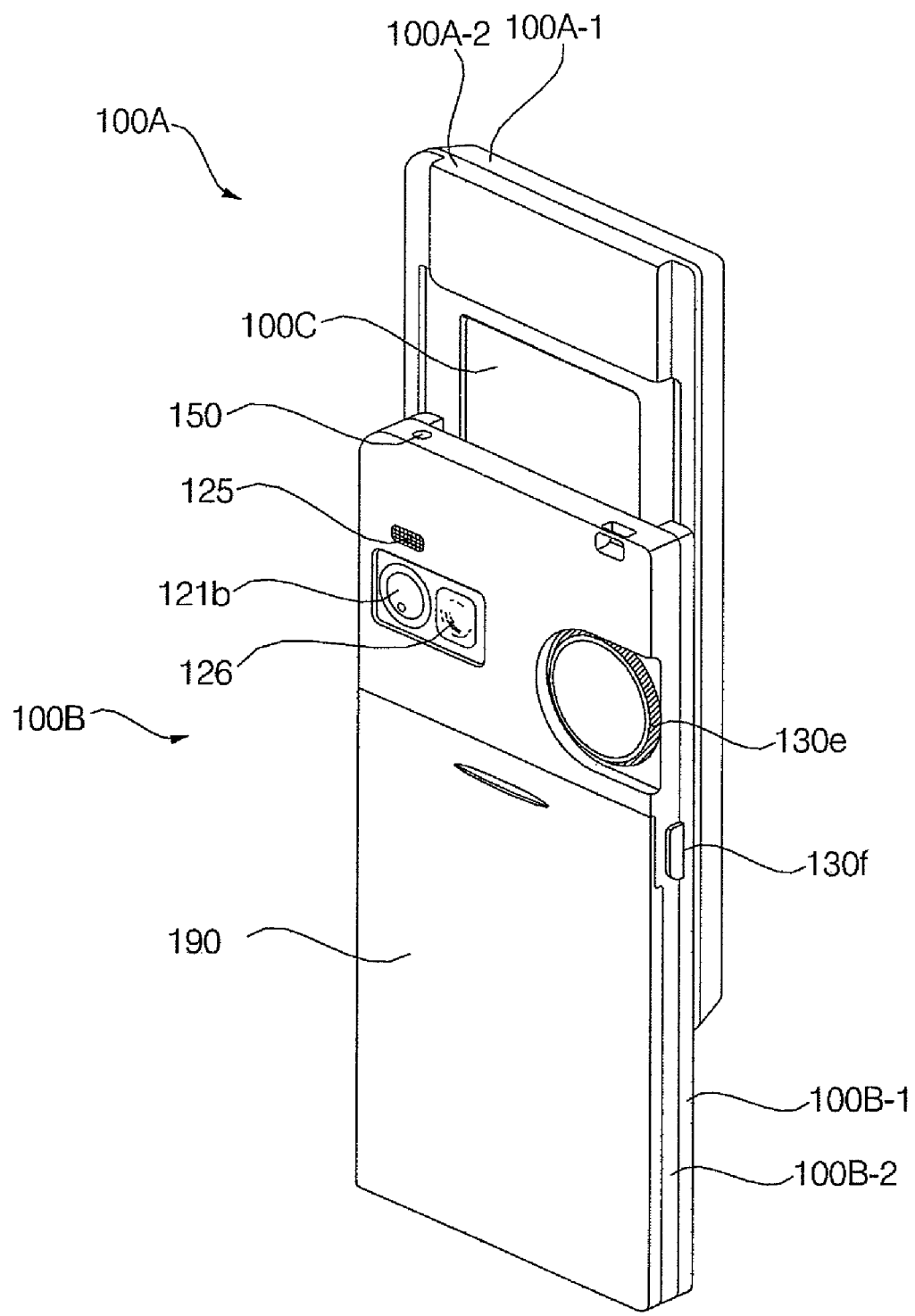
FIG. 3 illustrates a rear perspective view of the mobile terminal shown in FIG. 2.

FIG. 3 illustrates a rear perspective view of the mobile terminal 100 shown in FIG. 2. Referring to FIG. 3, the fifth user input module 130e, which is of a wheel type, and the second camera 121b may be disposed at the rear of the second rear case 100B-2 of the second body 100B, and a sixth user input module 130f may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A cameral flash 125 and a mirror 126 may be disposed near the second camera 121b. The cameral flash 125 may be used to illuminate a subject when the user attempts to capture an image of the subject with the second camera 121b. The mirror 126 may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the second rear case 100B-2. The antenna may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The second camera 121b and the other elements that have been described as being provided on the rear case 100A-2 may be provided on the front case 100A-1. In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

In this disclosure, a touch signal generated by touching the display module 151 with the tip of a finger or a fingernail is referred to as a fingernail touch, and a touch signal generated by touching the display module 151 with the palmar surface of a finger and including fingerprint information is referred to as a fingerprint touch. A fingernail touch is a variation of a fingerprint touch. Any other touch signal, excluding a fingernail touch and a fingerprint touch can be referred to as an ordinary touch.

The display module 151 may be configured to be able to identify a fingernail touch. Touch panels are largely classified into a resistive touch panel, a capacitive touch panel, an optical panel and an ultrasonic touch panel. In order to identify a fingernail touch, the display module 151 may use the combination of a capacitive method and a resistive method or an acoustic pulse recognition method.

FIG. 4(a) illustrates the structure of a typical resistive touch panel. Referring to FIG. 4(a), the resistive touch panel may include a stack of a base layer 50, an LCD module 51 deposited on the base layer 50, and the upper layer 52. The upper layer 52 is coated with electrically conductive and resistive layers made with indium tin oxide (ITO). The thin layers are separated by invisible spacers.

FIG. 4(b) illustrates the structure of a hybrid touch panel, which is the combination of a resistive touch panel and a capacitive touch panel. Referring to FIG. 4(b), the hybrid touch panel may have the same structure as the resistive touch panel shown in FIG. 4(a) except for additionally including a capacitive sensor film 53. If the hybrid touch panel is used as the display module 151, the display module 151 can precisely determine whether it is being touched and which part of it is being touched, and can easily distinguish a fingernail touch from an ordinary touch because a fingernail touch has a different capacitance and pattern from an ordinary touch.

Referring to FIG. 5, a plurality of sensors 141a through 141d capable of sensing acoustic pulses may be installed near the display module 151. In this case, the display Λ module 151 can easily distinguish a fingernail touch from an ordinary touch because a fingernail touch differs from an ordinary touch in terms of the number of acoustic pulses generated.

If a capacitive touch screen is used as the display module 151, the display module 151 can distinguish a fingernail touch from an ordinary touch through the analysis of a touch signal pattern, given that a fingernail touch and an ordinary touch have different patterns. In order to distinguish fingernail touches made by different fingers, the touch signal patterns of the fingernail touches may also be analyzed, or the fingerprints of the different fingers may be used.

Figures 6, 7:
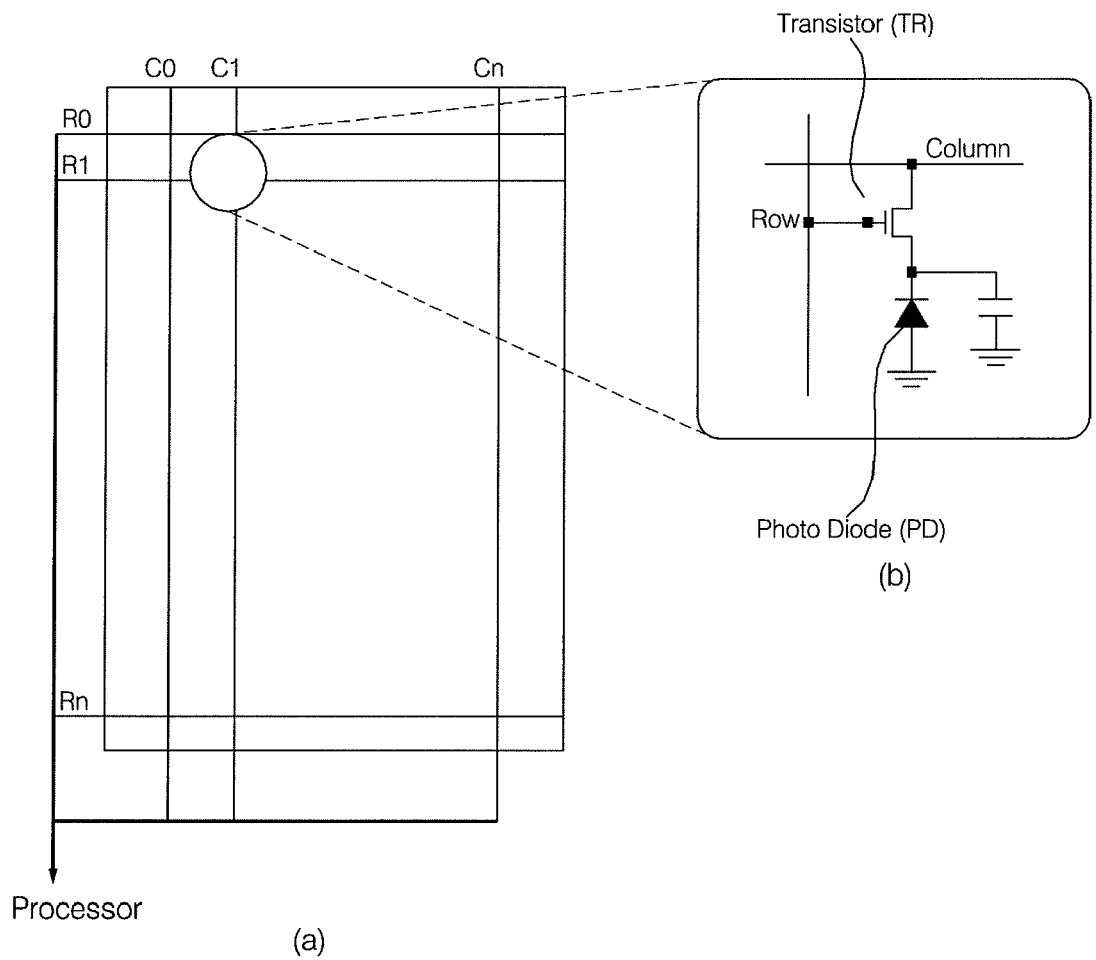
FIGS. 6 and 7 illustrate a display module capable of identifying a fingerprint, which can be used in the mobile terminal shown in FIG. 1 according to an embodiment of the present invention.

The display module 151 may be configured to be able to identify a fingerprint. In this case, the display module 151 may include an LCD module with a photo sensor embedded therein or an LCD module covered with a scan film with a photo sensor. For example, the display module 151 may include a transparent scan film and a touch sensor. Referring to FIG. 6, the transparent scan film may include a transparent film, which is formed of a transparent material such as glass, and a plurality of photodiodes PD and a plurality of transistors TR, which are mounted on the transparent film and are disposed at the intersections of a plurality of rows $R_0$ through $R_n$ and a plurality of columns $C_0$ through $C_n$ on the transparent film. Thus, the transparent scan film may be able to scan any object placed thereon by using an electric signal whose level varies according to the amount of light applied to the photodiodes.

It is possible to perform a black-and-white scan operation including fingerprint identification by using a basic scan function of the scan film. In addition, it is possible to perform a color scan operation. In addition, it is possible to perform a color scan operation by combining light reflected from each pixel of the LCD module at the rear of the display module 151. In this case, the amount of red, green or blue light reflected from each pixel of the LCD module may be calculated using tables shown in FIG. 8, and red, green and blue light may be combined based on the results of the calculation. However, the present invention is not restricted to this. That is, various matrices or functions, other than the tables shown in FIG. 7, may be used to combine red, green and blue light.

Since the display module 151 can calculate coordinates based on a variation in the amount of light by using a photo sensor, the display module 151 not only can perform a scan operation but also can serve as an input device capable of receiving various types of touches such as a single- or a multi-touch.

As described above, the display module 151 may be able not only to perform a scan operation but also to receive various types of touches by using a scan structure of a photo sensor without a requirement of a touch sensor. When no touch sensor is used in the display module 151, the manufacturing cost of the display module 151 can be reduced. On the other hand, when a touch sensor is used in the display module 151, the recognition of a touch signal can be stabilized. The display module 151 has been described above as identifying a fingerprint using a photo sensor, but the present invention is not restricted to this. That is, the display module 151 may identify a fingerprint using various methods other than using a photo sensor.

Figure 8:
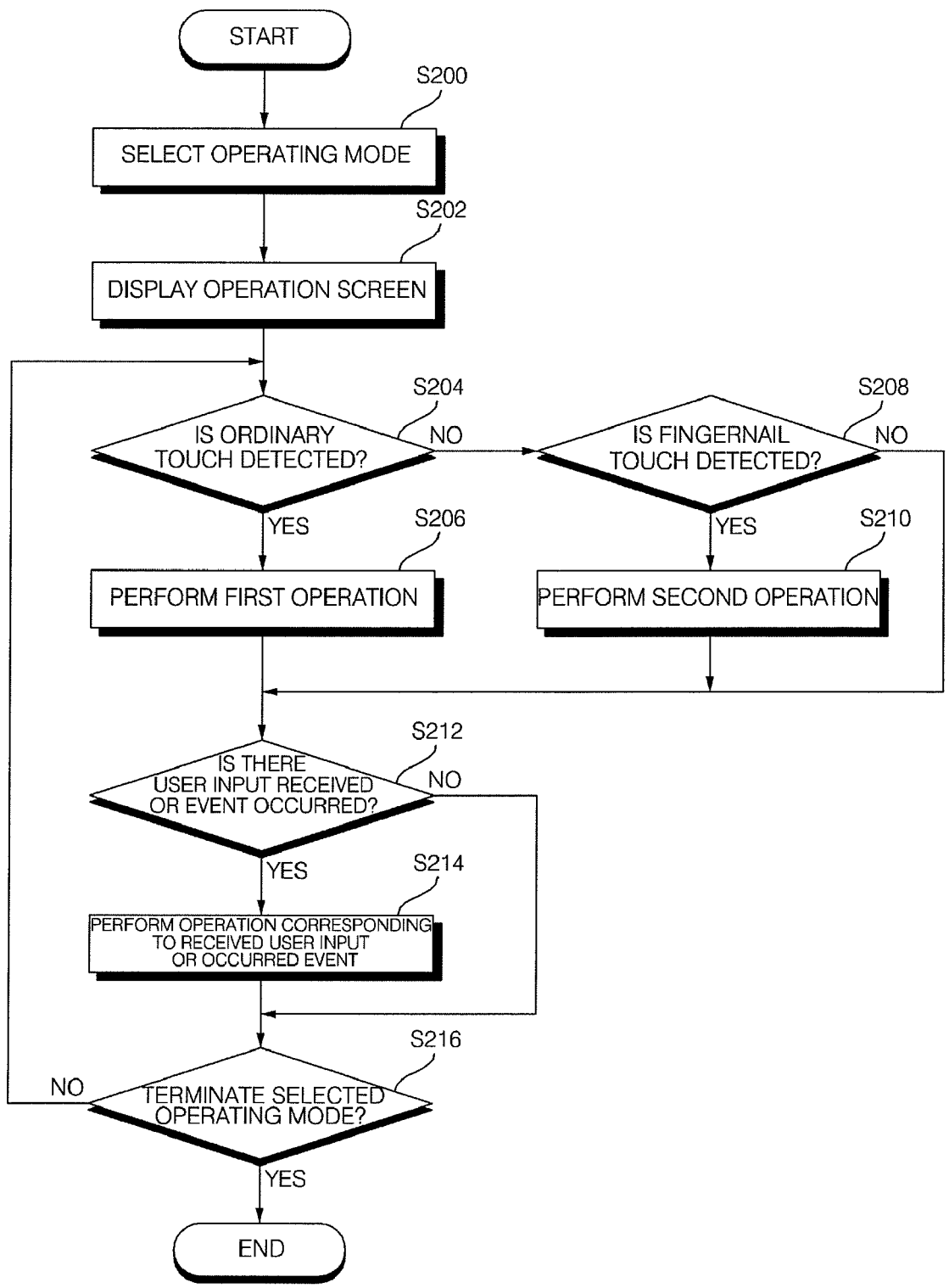
FIG. 8 illustrates a flowchart of a method of controlling the operation of a mobile terminal according to a first embodiment of the present invention.

FIG. 8 illustrates a flowchart of a method of controlling the operation of a mobile terminal according to a first exemplary embodiment of the present invention. In the first exemplary embodiment and other exemplary embodiments of the present invention, a fingernail touch, which is generated by touching the display module 151 with the tip of a finger or a fingernail, may be distinguished from an ordinary touch.

Referring to FIG. 8, if a predetermined operating mode such as a camera mode, a multimedia file playback mode, or a DMB mode is selected in response to, for example, a user command (S200), the controller 180 may display an operation screen corresponding to the selected operating mode on the display module 151 (S202). Examples of the operation screen include an idle screen, a still or moving image-viewer screen, a broadcast screen, a map screen and a webpage screen.

Thereafter, if an ordinary touch is detected from the display module 151 (S204), the controller 180 may control a first operation relevant to the selected operating mode to be performed (S206). On the other hand, if a fingernail touch is detected from the display module 151 (S208), the controller 180 may control a second operation relevant to the selected operating mode to be performed (S210).

The first and second operations may vary from one operating mode to another operating mode. For example, the first operation may involve selecting or executing an object as performed in response to a click of the left button of the mouse, and the second operation may involve displaying a shortcut menu as performed in response to a click of the right button of the mouse. More specifically, if a fingernail touch for selecting a 'send' key is detected from the display module 151 when an idle screen is displayed on the display module 151, a video call function may be executed. On the other hand, if an ordinary touch for selecting the 'send' key is received, a voice call function may be executed. Alternatively, different information may be displayed according to whether a fingernail touch or an ordinary touch is detected.

If another user input such as a key input is received (S212), the controller 180 may control an operation relevant to the received user input to be performed (S214).

Operations S204 through S214 may be repeatedly performed until the user chooses to escape from the selected operating mode (S216).

In this manner, it is possible to perform different operations according to whether an ordinary touch or a fingernail touch is detected.

It will hereinafter be described in further detail how to perform different operations according to whether an ordinary touch or a fingernail touch is detected. If a fingernail touch for selecting a 'send' key is detected, one of a number of shortcut menu items may be executed. On the other hand, if an ordinary touch for selecting the 'send' key is detected, a dial number input screen may be displayed. If a fingernail touch is detected when an image-viewer screen is displayed, a menu for attaching an image to a multimedia messaging service (MMS) message may be displayed, or an image capture function may be executed. On the other hand, if an ordinary touch is detected when the image viewer screen is displayed, an image currently being displayed on the image viewer screen may be enlarged and may be displayed on the whole display module 151. If a fingernail touch is detected when a moving image viewer screen is displayed, a moving image currently being displayed on the moving image viewer screen may be recorded, or may be captured and then attached to, for example, a message to be sent, or the whole moving image may be attached to, for example, a message to be sent.

As described above, different information may be displayed according to whether an ordinary touch or a fingernail touch is detected. For example, if one of a plurality of items included in a phonebook list, a call list, or a message list is selected in response to a fingernail touch, recent event information such as the number of calls made to or received from a person corresponding to the selected item or the number of messages sent to or received from the person corresponding to the selected item may be displayed. On the other hand, if one of the plurality of items is selected in response to an ordinary touch, detailed information regarding a person corresponding to the selected item may be displayed. If a fingernail touch is detected when a moving image viewer screen is displayed, additional information regarding the moving image viewer screen may be displayed. On the other hand, if an ordinary touch is detected when the moving image viewer screen is displayed, information regarding a moving image file currently being displayed on the moving image viewer screen may be displayed.

If a fingernail touch is detected when a broadcast screen is displayed, additional information regarding a broadcast program currently being displayed on the broadcast screen may be displayed. On the other hand, if an ordinary touch is detected when the broadcast screen is displayed, information regarding the broadcast program currently being displayed on the broadcast program may be displayed.

If a fingernail touch is detected from a certain point on a map screen, detailed information regarding a place corresponding to the certain point on the map screen may be displayed. On the other hand, if an ordinary touch is detected from the certain point on the map screen, an option menu may be displayed. In short, it is possible to display different information according to whether an ordinary touch or a fingernail touch is detected.

When a fingernail touch is detected, additional information may be displayed on a certain part of the display module 151 as a popup window or the combination of a popup window and an on-screen display (OSD) message.

Figure 9:
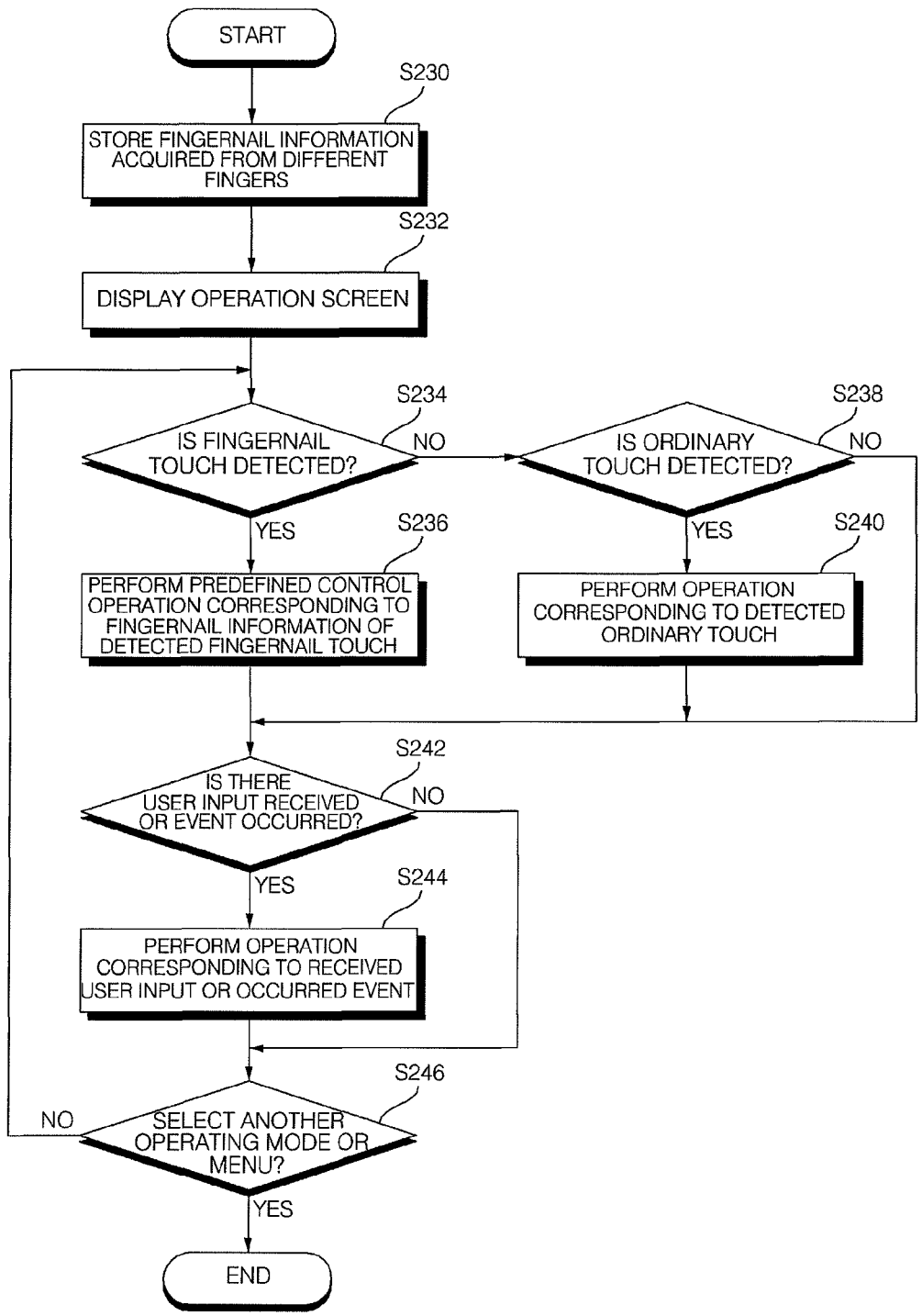
FIG. 9 illustrates a flowchart of a method of controlling the operation of a mobile terminal according to a second exemplary embodiment of the present invention.

FIG. 9 illustrates a flowchart of a method of controlling the operation of a mobile terminal according to a second exemplary embodiment of the present invention. Referring to FIG. 9, a plurality of pieces of fingernail information acquired from different fingers of the user may be stored in the memory 160 (S230). The plurality of pieces of fingernail information may include a plurality of fingerprints acquired from different fingers of the user. Alternatively, the plurality of pieces of fingernail information may include information such as a touch signal pattern for identifying each finger used to generate a fingernail touch.

Thereafter, the controller 180 may display an operation screen corresponding to a current menu or the current operating mode on the display module 151 (S232). Thereafter, if a fingernail touch is detected from the display module 151 (S234), the controller 180 may control a predefined control operation corresponding to fingernail information of the detected fingernail touch to be performed (S236). The user may set in advance what control operation is to be performed in accordance with the fingernail information of the detected fingernail touch. The controller 180 may generate a haptic effect corresponding to the predefined control operation.

If an ordinary touch is detected from the display module 151 (S238), the controller 180 may control an operation corresponding to the point of the detection of the ordinary touch to be performed (S240). If another user input such as a key input is received (S242), the controller 180 may control an operation corresponding to the received user input to be performed (S244). Operations S234 through S244 may be repeatedly performed until the user chooses to escape from the current menu or the current operating mode (S246).

In this manner, it is possible to perform different control operations in response to different fingernail touches made by different fingers.

Examples of the predefined control operation performed in operation S236 include 'Copy,' 'Move,' 'Paste,' 'Delete,' 'Delete All,' 'Hide,' 'Show,' 'Zoom In,' 'Zoom Out,' 'Attach,' 'Capture,' 'Record,' 'Add,' 'Edit,' 'View,' 'View Details,' 'Sort,' 'Search,' 'Dial,' 'Send Message,' 'Send IrDA,' and 'Send BT.' Different control operations may be associated with different fingernail touches made by different fingers, thereby performing various control operations in response to a fingernail touch. For example, if an image viewer screen or a web browser screen is fingernail-touched with a thumb, the image viewer screen or the web browser screen may be enlarged. On the other hand, if the image viewer screen or the web browser screen is fingernail-touched with a little finger, the image viewer screen or the web browser screen may be reduced. The image viewer screen or the web browser screen may be gradually enlarged or reduced in accordance with the duration for which a fingernail touch is detected.

If a photo or a moving image is fingernail-touched with an index finger, the photo or the moving image may be copied. Then, the copied photo or moving image may be pasted in response to a fingernail touch made by a middle finger. If a fingernail touch made by an index finger is detected from the display module 151 when a phonebook menu screen, a call list screen or a message list screen is displayed on the display module 151, such a function as sending a short message service (SMS) message may be performed. On the other hand, if a fingernail touch input generated by a middle finger is detected from the display module 151 when the phonebook menu screen, the call list screen or the message list screen is displayed on the display module 151, such a function as sending an MMS message may be performed. If a fingernail touch made by an index finger is detected during a video-on-demand (VOD) streaming service or a broadcast service or during a video call, a recording function may be executed. On the other hand, if a fingernail touch made by a middle finger is detected during the VOD streaming service or the broadcast service or during the video call, an image capture function may be performed.

Even when the same fingernail touches are detected, different control functions may be performed according to the duration of detection of each of the fingernail touches. For example, if a fingernail touch made by an index finger is detected from a photo for less than a predefined amount of time, the photo may be attached. On the other hand, if the fingernail touch is detected from the photo for more than the predefined amount of time, the photo may be captured.

Figure 10:
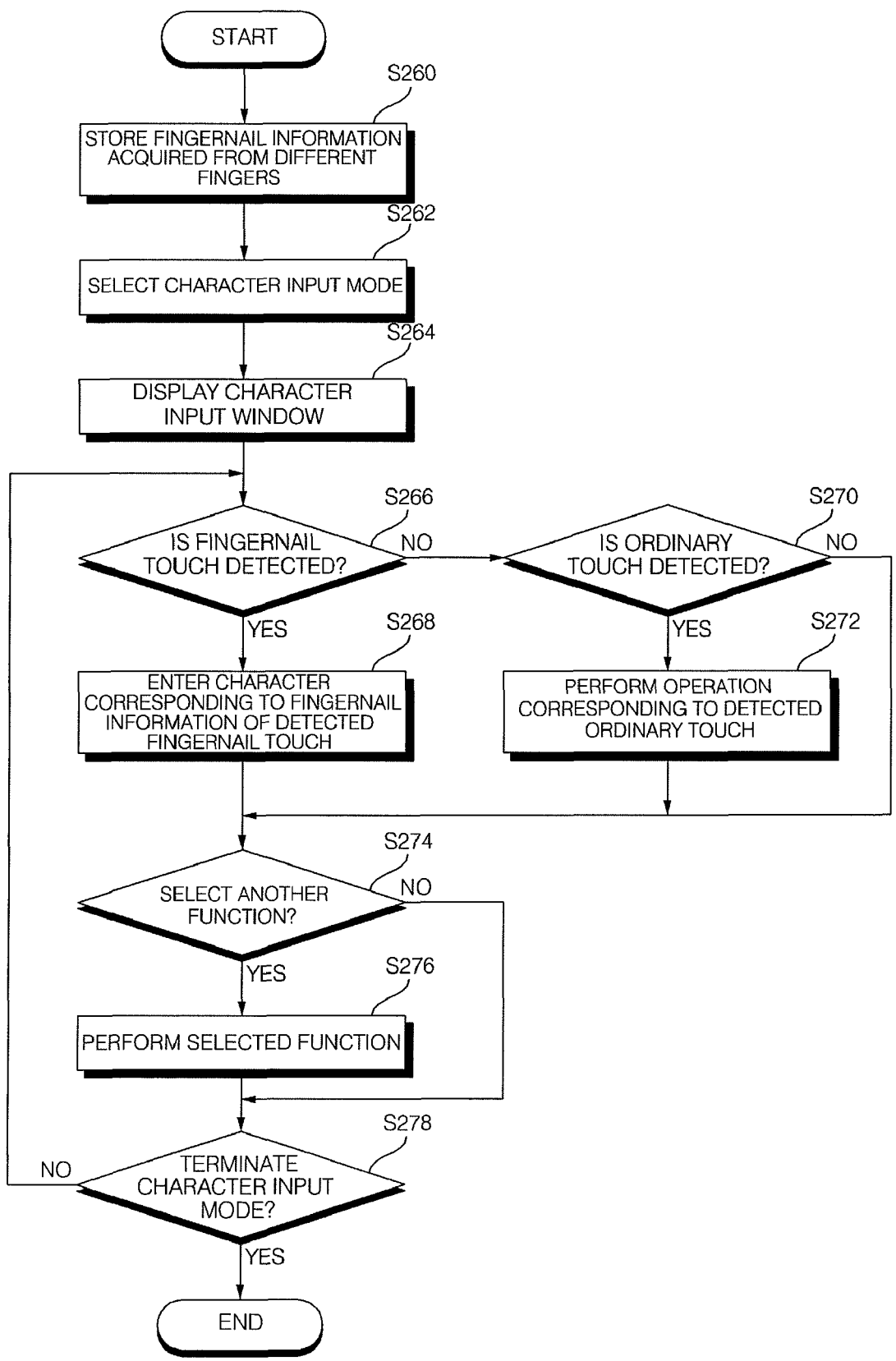
FIG. 10 illustrates a flowchart of a method of controlling the operation of a mobile terminal according to a third exemplary embodiment of the present invention.

FIG. 10 illustrates a flowchart of a method of controlling the operation of a mobile terminal according to a third exemplary embodiment of the present invention. Referring to FIG. 10, a plurality of pieces of fingernail information acquired from different fingers of the user may be stored in the memory 160 (S260). If a character input mode for, for example, entering a phone number, writing a message or searching for a file, is selected in response to a user command (S262), the controller 180 may display a character input window including a plurality of touch keys for entering numbers, Korean characters, alphabet letters, and symbols on the display module 151 (S264). Examples of the character input window include a touch keypad window.

If one of the touch keys of the character input window is selected in response to a fingernail touch and the selected touch key is associated with a plurality of characters (S266), the controller 180 may control one of the characters corresponding to fingernail information of the fingernail touch to be entered (S268). More specifically, when two or more different characters or uppercase and lowercase forms of an alphabet letter are allocated to the selected touch key, the controller 180 may control the different characters or the uppercase and lowercase forms of the alphabet letter to be entered in response to different fingernail touches made by different fingers. For example, if a predetermined touch key associated with first and second characters is fingernail-touched with a first finger, the controller 180 may control the first character to be entered. On the other hand, if the predetermined touch key is fingernail-touched with a second finger, the controller 180 may control the second character to be entered.

Thereafter, the controller 180 may display the character entered in operation 5268 in a certain area on the display module 151, and may generate a haptic effect corresponding to the entered character. Alternatively, the controller 180 may control an operation corresponding to the entered character to be performed without displaying the entered character.

If an ordinary touch is detected from the display module 151 (S270), the controller 180 may control an operation corresponding to a point of the detection of the ordinary touch to be performed (S272). If a function other than entering characters is selected (S274), the controller 180 may control the selected function to be performed (S276). Operations S266 through S276 may be repeatedly performed until the user chooses to terminate the character input mode (S278).

In this manner, it is possible to enter different characters in response to different fingernail touches made by different fingers.

Figure 11:
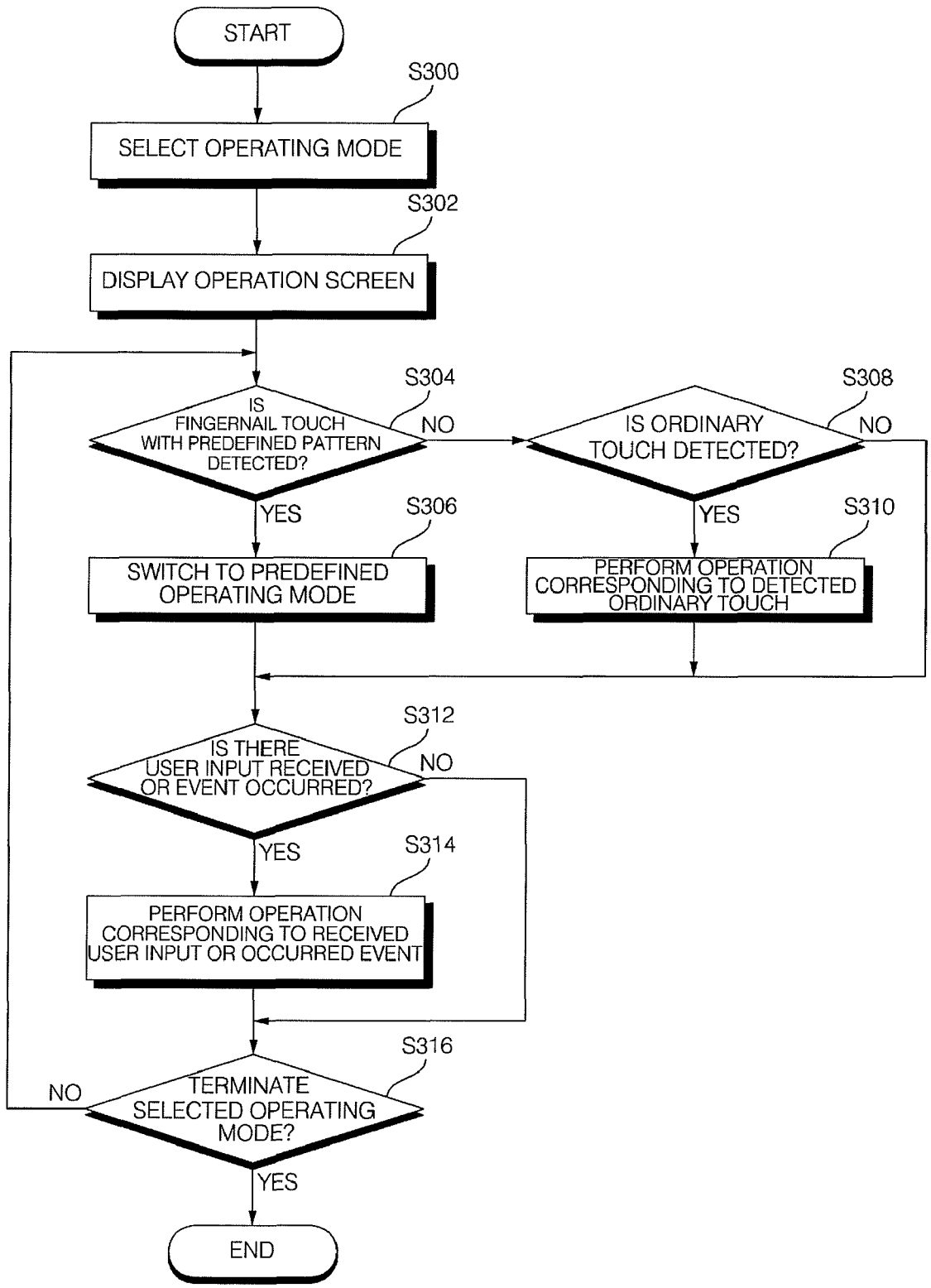
FIG. 11 illustrates a flowchart of a method of controlling the operation of a mobile terminal according to a fourth exemplary embodiment of the present invention.

FIG. 11 illustrates a flowchart of a method of controlling the operation of a mobile terminal according to a fourth exemplary embodiment of the present invention. Referring to FIG. 11, if a first operating mode is selected in response to a user command (S300), the controller 180 may display an operation screen corresponding to the first operating mode on the display module 151 (S302). Examples of the operation screen include an idle screen, a 'Send Message' screen, an 'Inbox' screen, an image viewer screen, a broadcast screen, a map screen and a webpage screen.

Thereafter, the controller 180 may determine whether a fingernail touch with a predefined pattern is being detected from the display module 151 (S304). A fingernail touch with the predefined pattern may be a touch and drag made by touching the display module 151 with the tip of a finger or a fingernail and dragging the finger or the fingernail across the display module 151 to draw a predetermined shape, such as an 'L' or a 'U.'

If it is determined in operation S304 that a fingernail touch with the predefined pattern is being detected, the controller 180 may switch the mobile terminal 100 to an operating mode (hereinafter referred to as the second operating mode) corresponding to the detected fingernail touch (S306). Examples of the second operating mode include a lock mode, an unlock mode, a multimedia playback mode, a 'Send Message' mode, a photo album viewer mode, and any operating mode set by the user.

If an ordinary touch is detected from the display module 151 (S308), the controller 180 may control an operation corresponding to a point of the detection of the ordinary touch to be performed (S310). More specifically, the controller 180 may control an operation relevant to an object selected in response to the ordinary touch to be performed.

If another user input such as a key input is received or an event occurs (S312), the controller 180 may control an operation corresponding to the received user input or the occurred event to be performed (S314). Operations S304 through S314 may be repeatedly performed until the user chooses to terminate the first or second operating mode (S316).

In this manner, it is possible to quickly switch from one operating mode to another operating mode simply through a fingernail touch.

Figure 12:
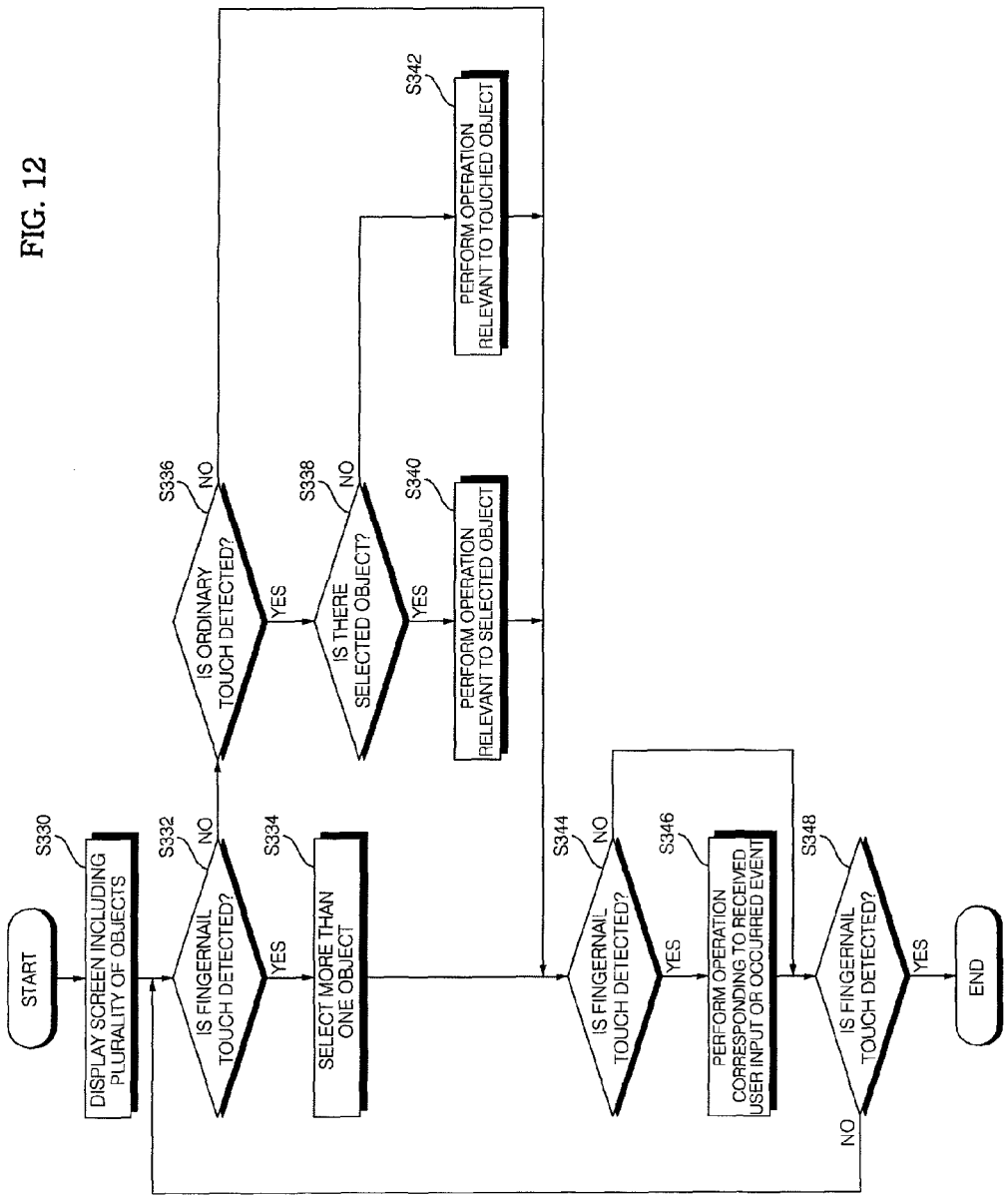
FIG. 12 illustrates a flowchart of a method of controlling the operation of a mobile terminal according to a fifth exemplary embodiment of the present invention.

FIG. 12 illustrates a flowchart of a method of controlling the operation of a mobile terminal according to a fifth exemplary embodiment of the present invention. Referring to FIG. 12, if an operation menu such as a phonebook menu, a 'Send Message' menu, an 'Inbox' menu, an MP3 player menu, a multimedia player menu, or an image viewer menu is selected in response to a user command, the controller 180 may display an operation screen including a plurality of objects corresponding to the selected operation menu on the display module 151 (S330).

Thereafter, if a fingernail touch is detected from one of the objects (S332), the controller 180 may control the object from which the fingernail touch is detected to be selected (S334). In this manner, one or more objects can be selected at the same time in response to a fingernail touch.

The selected object may be an item included in a list, an image, an icon or a touch key. The selected object may be displayed in a different color or shape from the other non-selected objects so as to be easily distinguishable. The controller 180 may generate a haptic effect corresponding to the selected object.

Thereafter, if an ordinary touch is detected (S336) when one of the objects is selected (S338), the controller 180 may control an operation relevant to the selected object to be performed (S340). Examples of the operation relevant to the selected object include deleting, copying, reducing and rotating the selected object, displaying a menu associated with the selected object, and switching from portrait mode to landscape mode or vice versa for the display of the selected object.

On the other hand, if an ordinary touch is detected (S336) when none of the objects are selected (S338), the controller 180 may control one of the objects from which the ordinary touch is detected to be selected (S342).

If another user input such as a key input is detected or an event occurs (S344), the controller 180 may control an operation corresponding to the received user input or the occurred event to be performed (S346). Operations S332 through S346 may be repeatedly performed until the user chooses to terminate the current operation menu (S348).

In this manner, it is possible to select more than one object at the same time simply through a fingernail touch and then perform various operations relevant to the selected objects through an ordinary touch.

Figure 13:
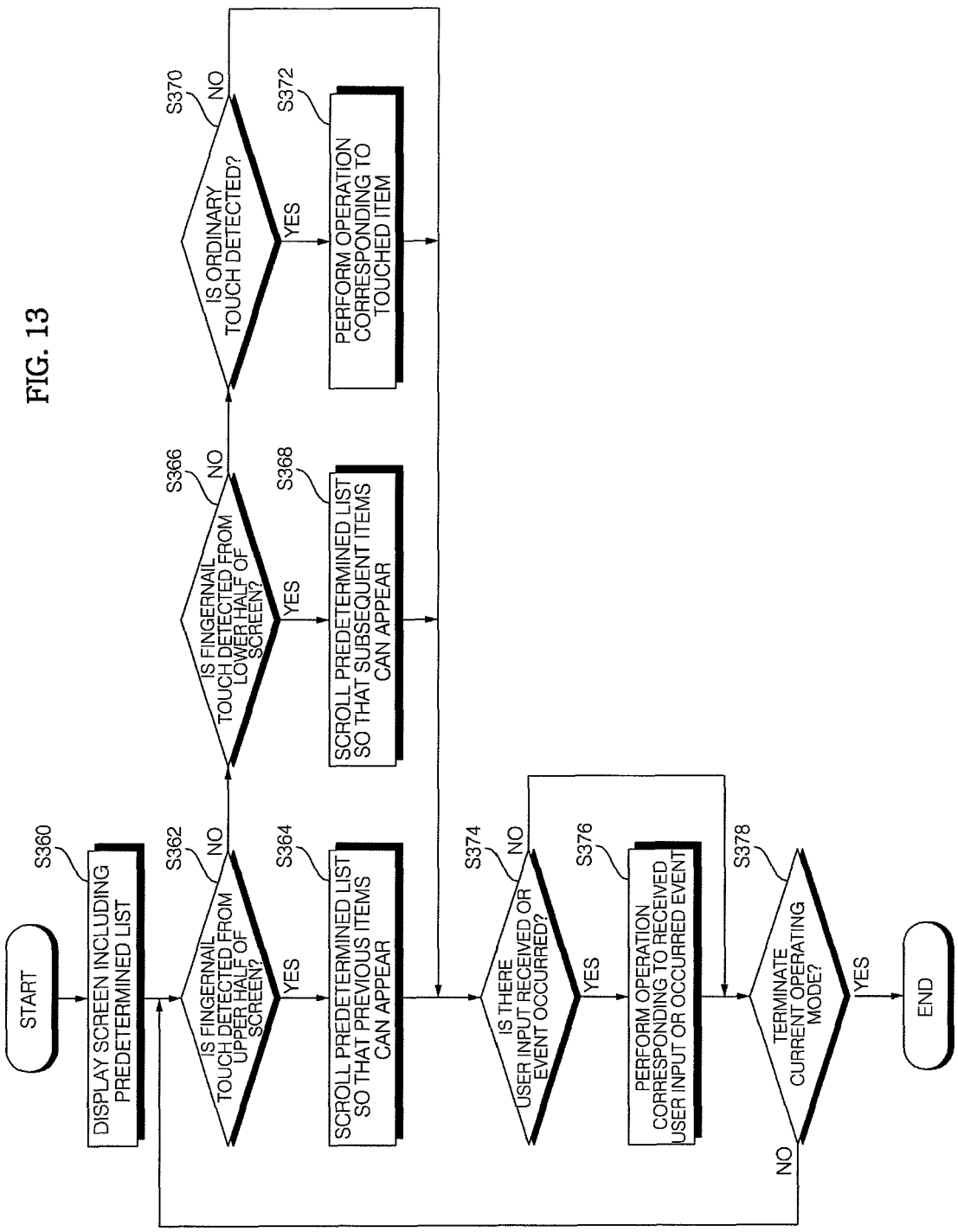
FIG. 13 illustrates a flowchart of a method of controlling the operation of a mobile terminal according to a sixth exemplary embodiment of the present invention.

FIG. 13 illustrates a flowchart of a method of controlling the operation of a mobile terminal according to a sixth exemplary embodiment of the present invention. Referring to FIG. 13, if an operation menu such as a phonebook menu, a 'Send Message' menu, an 'Inbox' menu, an MP3 player menu, a multimedia player menu, or an image viewer menu is selected in response to a user command, the controller 180 may display an operation screen including a predetermined list corresponding to the selected operation menu on the display module 151 (S360).

Thereafter, if a fingernail touch is detected from an upper half of the operation screen (S362), the controller 180 may scroll the predetermined list so that a number of items followed by a plurality of items currently being displayed on the operation screen can appear (S364).

On the other hand, if a fingernail touch is detected from a lower half of the operation screen (S366), the controller 180 may scroll the predetermined list so that a number of items following the plurality of items currently being displayed on the operation screen can appear (S368).

The predetermined list may be scrolled up or down on a page-by-page basis. That is, if the predetermined list is scrolled up or down when a total of n items are displayed on the display module 151, n previous or subsequent items can newly appear on the display module 151. The predetermined list may be scrolled up or down according to whether a fingernail touch is detected from a left half or a right half of the operation screen.

If an ordinary touch is detected from the display module 151 and thus one of the plurality of items currently being displayed on the operation screen is selected (S370), the controller 180 may control an operation relevant to the selected item to be performed (S372). Examples of the operation relevant to the selected item include executing the selected item and displaying a menu associated with the selected item.

If another user input such as a key input is received or an event occurs (S374), the controller 180 may control an operation corresponding to the received user input or the occurred event to be performed (S376). Operations S362 through S376 may be repeatedly performed until the user chooses to terminate the current operation menu (S378).

In this manner, it is possible to effectively scroll a screen simply through a fingernail touch. The sixth exemplary embodiment can be applied not only to a list screen but also to various other screens such as a webpage screen. For example, if a fingernail touch is detected from an upper half of a webpage screen, a previous webpage may be displayed. On the other hand, if a fingernail touch is detected from a lower half of the webpage screen, a subsequent webpage may be displayed.

Figure 14:
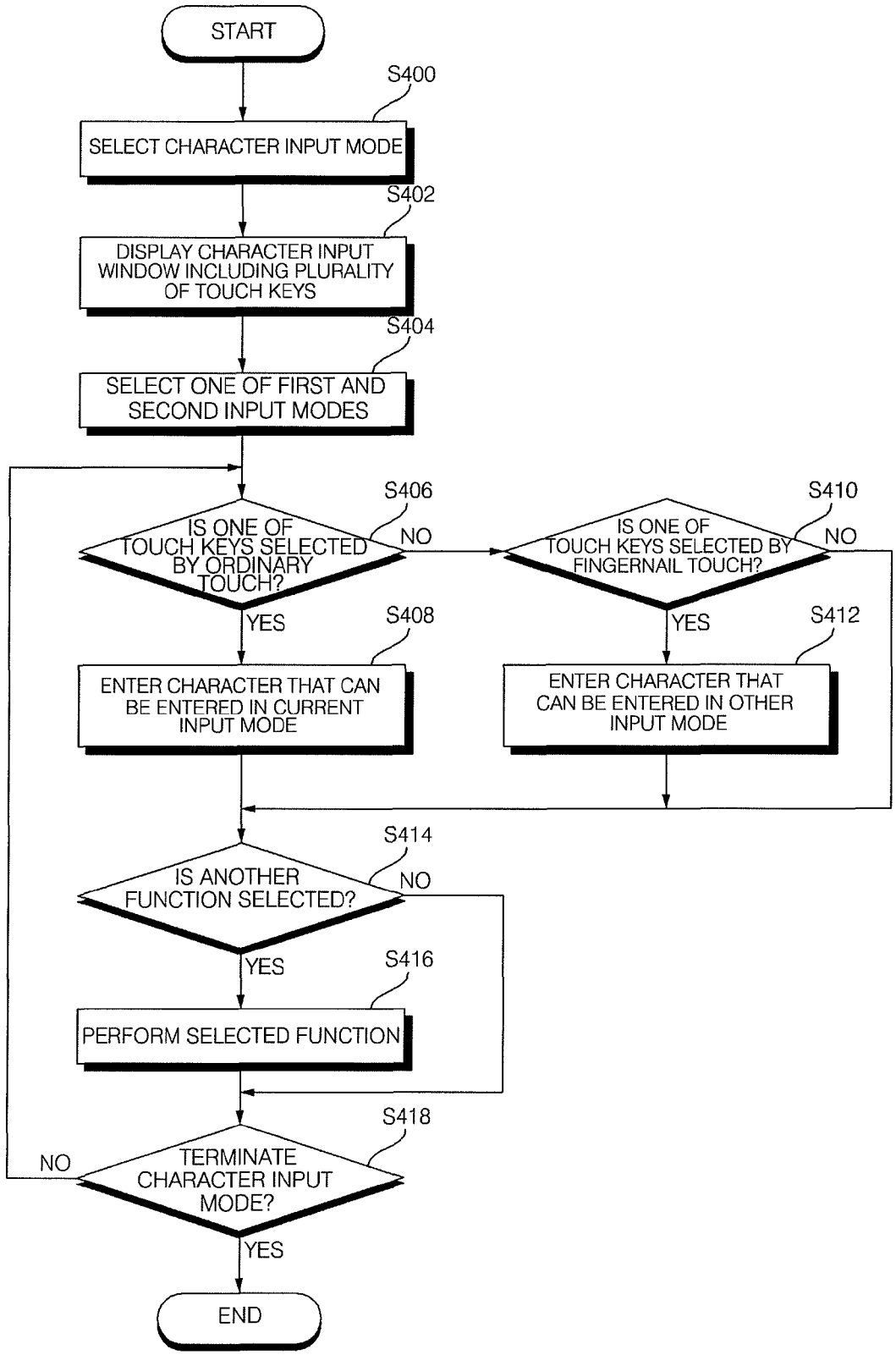
FIG. 14 illustrates a flowchart of a method of controlling the operation of a mobile terminal according to a seventh exemplary embodiment of the present invention.

FIG. 14 illustrates a flowchart of a method of controlling the operation of a mobile terminal according to a sixth exemplary embodiment of the present invention. Referring to FIG. 14, if a character input mode for entering a phone number, writing a message, or searching for a phone number or a file is selected in response to a user command (S400), the controller 180 may display a character input window including a plurality of touch keys for entering numbers, Korean characters, alphabet letters, and symbols on the display module 151 (S402). Examples of the character input window include a touch keypad window.

Thereafter, the controller 180 may select one of first and second input modes, for example, the first input mode, in response to a user command (S404). The first and second input modes may be uppercase and lowercase input modes, Hirakana and Katakana input modes, or a character input mode and a special symbol input mode.

If one of the touch keys of the character input window is selected in response to an ordinary touch and the selected touch key is associated with a number of characters (S406), the controller 180 may control one of the characters that can be entered in the first input mode to be entered (S408).

On the other hand, if one of the touch keys of the character input window is selected in response to a fingernail touch and the selected touch key is associated with a number of characters (S410), the controller 180 may control one of the characters that can be entered in the second input mode to be entered (S412).

For example, when a current input mode is a lowercase input mode, a lowercase alphabet letter may be entered in response to an ordinary touch, and an uppercase alphabet letter may be entered in response to a fingernail touch. As a result, it is possible to quickly enter various characters or symbols simply through a fingernail touch without the need to switch from one input mode to another.

If a function other than entering characters is selected (S414), the controller 180 may control the selected function to be performed (S416).

Operations S406 through S416 may be repeatedly performed until the user chooses to terminate the character input mode (S418).

In this manner, it is possible to easily switch from a lowercase input mode to an uppercase input mode or vice versa simply through a fingernail touch.

Figure 15:
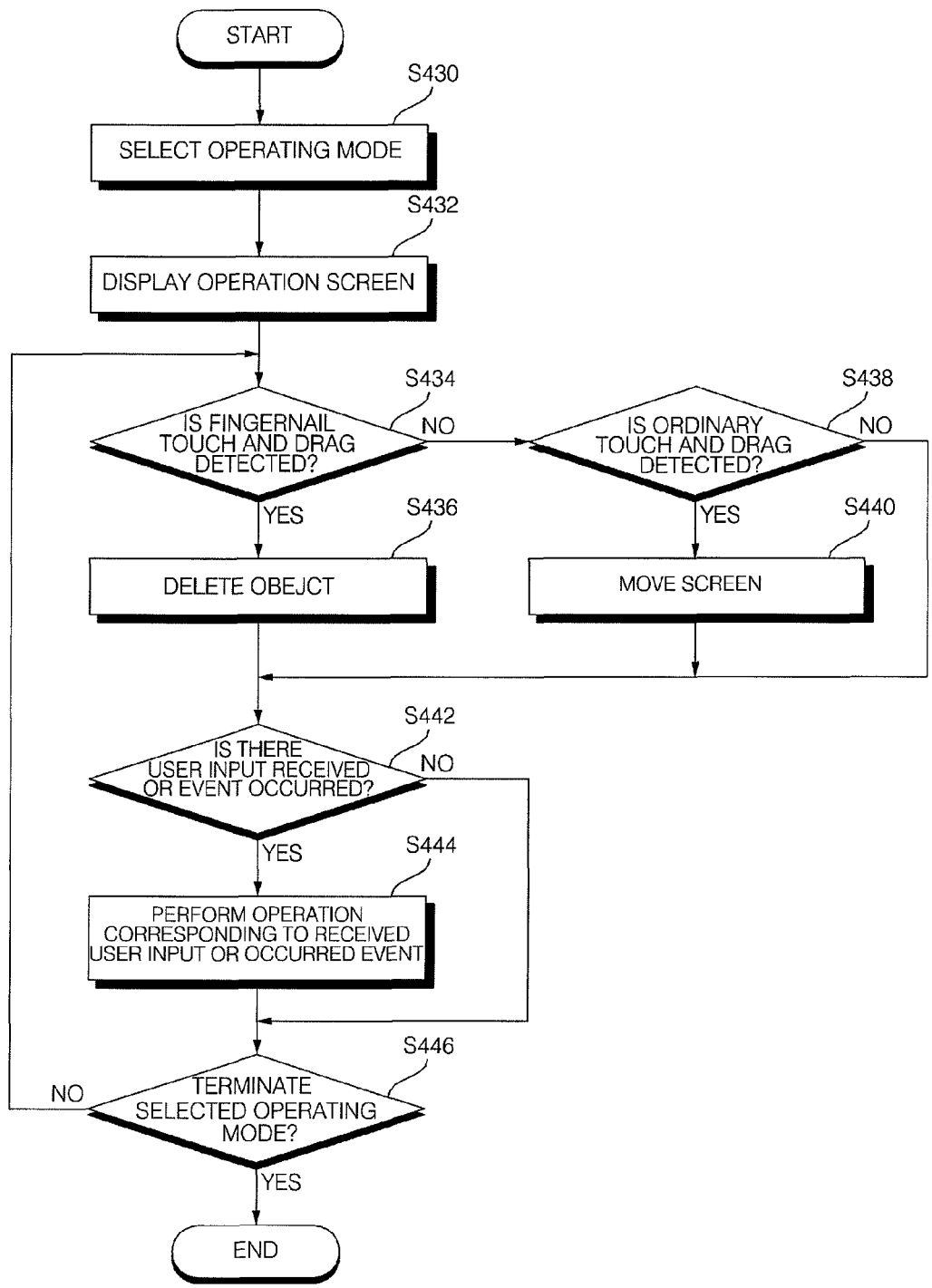
FIG. 15 illustrates a flowchart of a method of controlling the operation of a mobile terminal according to an eighth exemplary embodiment of the present invention.

FIG. 15 illustrates a flowchart of a method of controlling the operation of a mobile terminal according to an eighth exemplary embodiment of the present invention. Referring to FIG. 15, if an operating menu such as a phonebook menu, a 'Send Message' menu, an 'Inbox' menu, an MP3 player menu, a multimedia player menu, or an image viewer menu is selected in response to a user command (S430), the controller 180 may display an operation screen including a plurality of objects corresponding to the selected operation menu on the display module 151 (S432).

Thereafter, if the user touches the display module 151 with a fingernail and then drags the fingernail across the display module 151, i.e., if a fingernail touch and drag is detected from the operation screen (S434), the controller 180 may control an object selected in response to the fingernail touch to be deleted from the operation screen (S436). The deleted object may be an item included in a predetermined list, an image, an icon or a character or alphabet letter entered. The controller 180 may generate a haptic effect corresponding to the deleted object.

Thereafter, if an ordinary touch and drag is detected from the operation screen (S438), the controller 180 may move the operation screen by an amount corresponding to the distance of the drag (S440).

If another user input such as a key input is received or an event occurs (S442), the controller 180 may control an operation corresponding to the received user input or the occurred event to be performed (S444). Operations S434 through S444 may be repeatedly performed until the user chooses to terminate the current operation menu (S446).

In this manner, it is possible to easily delete an object displayed on the display module 151 simply through a fingernail touch.

Figure 16:
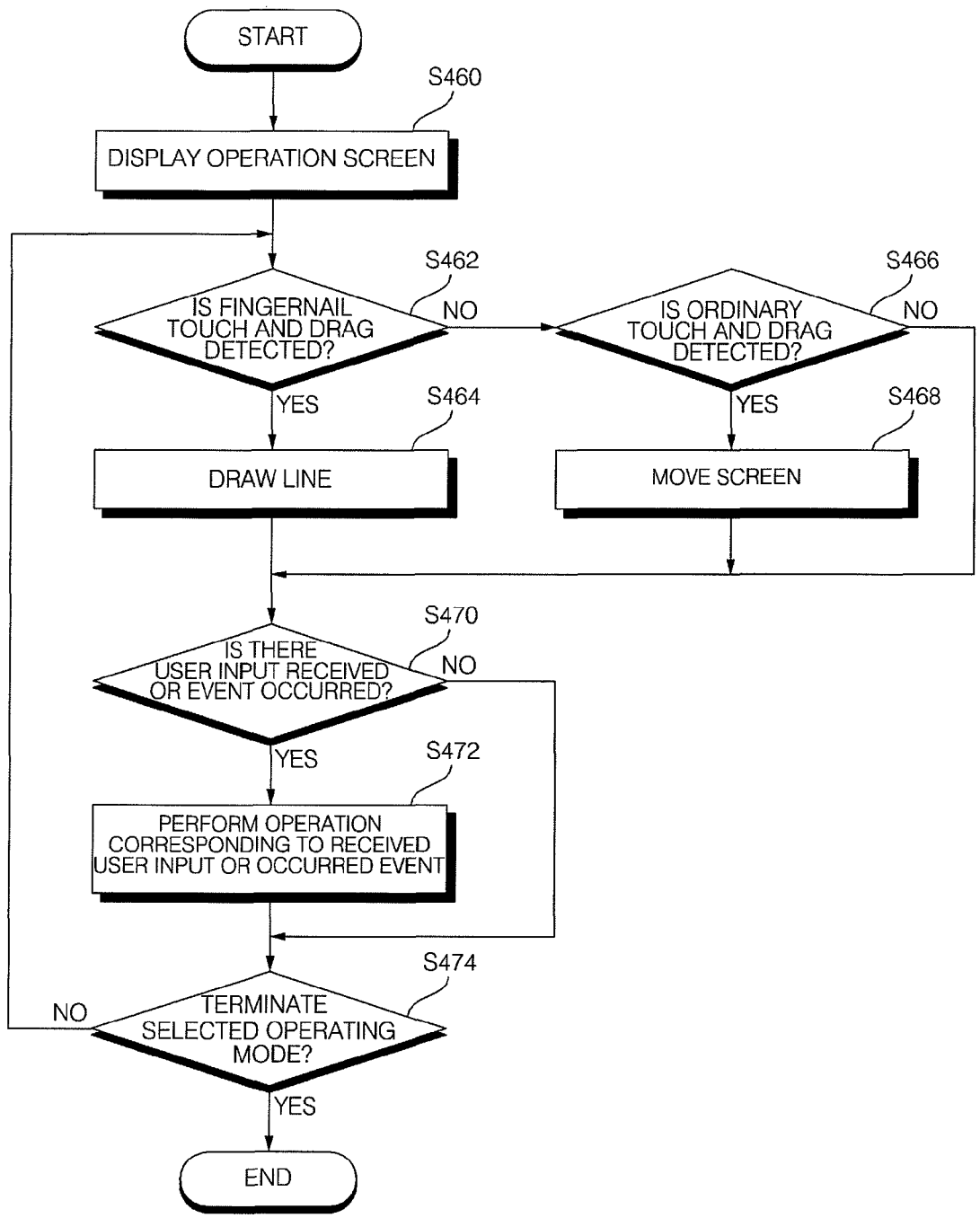
FIG. 16 illustrates a flowchart of a method of controlling the operation of a mobile terminal according to a ninth exemplary embodiment of the present invention.
Figure 17:
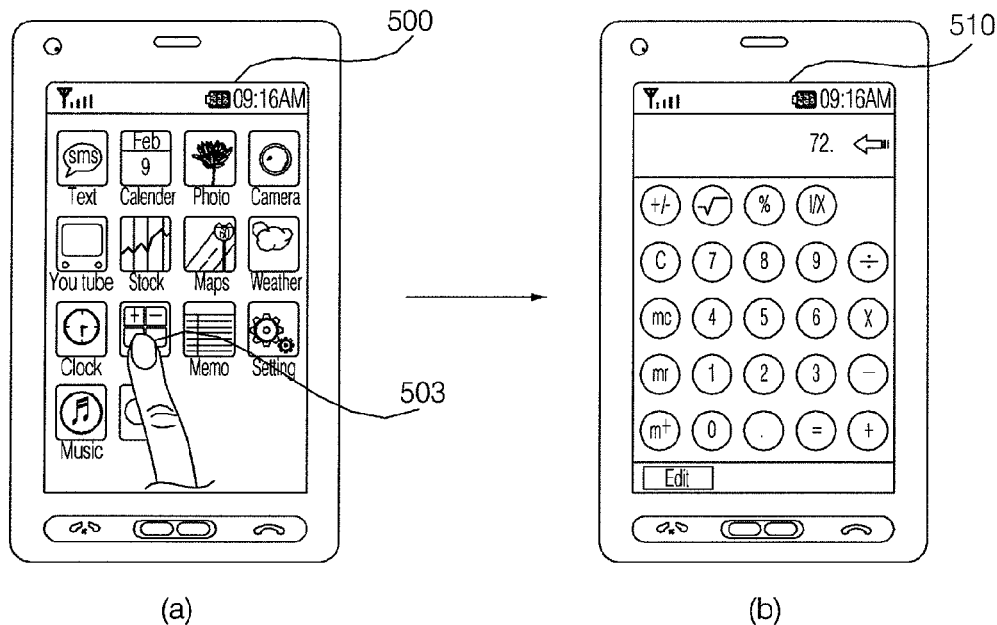
FIGS. 17 through 26 illustrate how to perform different operations according to whether an ordinary touch or a fingernail touch is detected.
Figure 18:
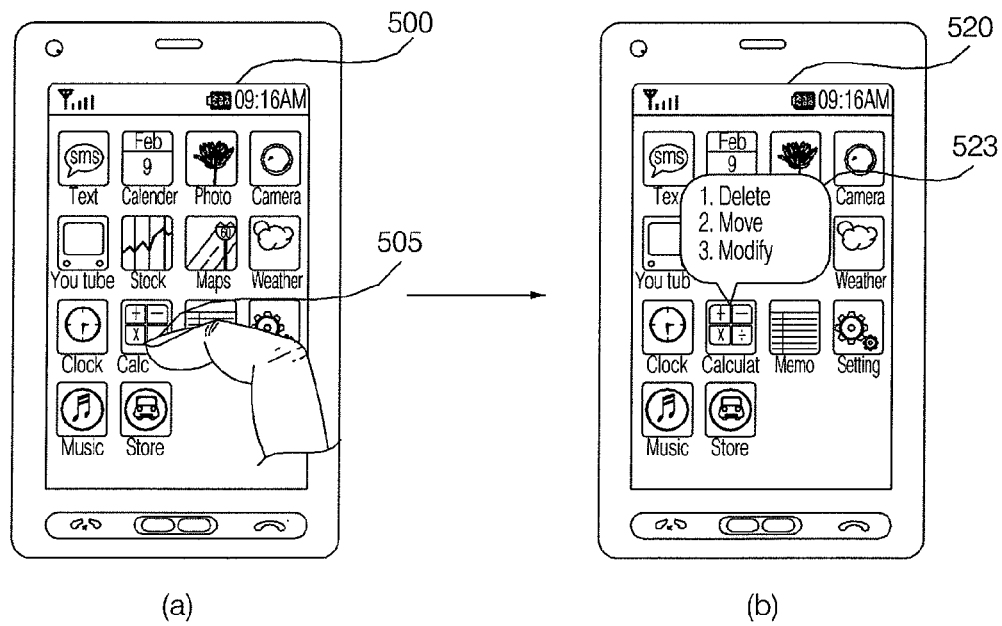
Figure 19:
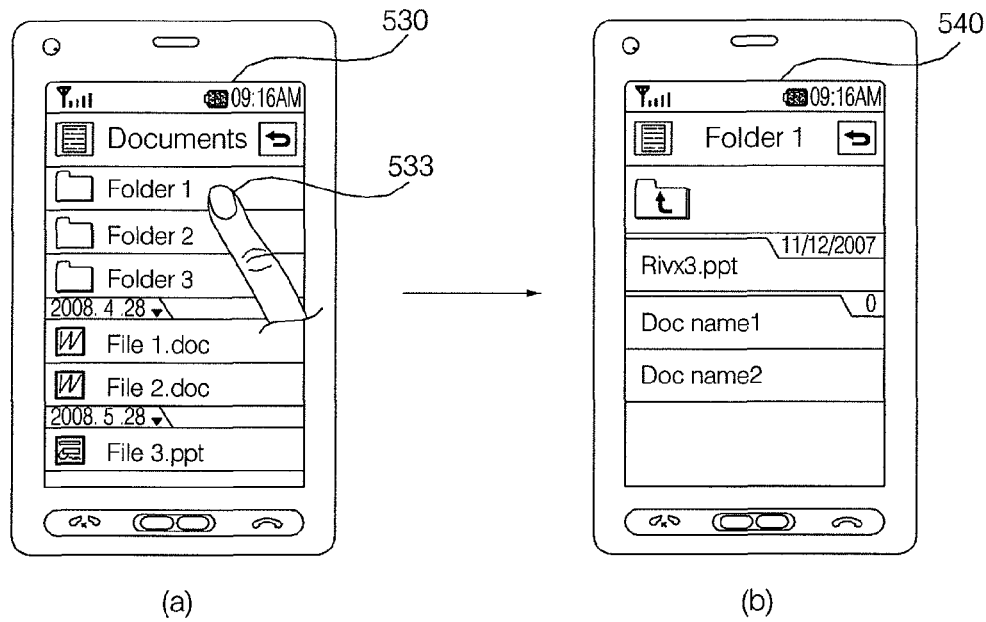
Figure 20:
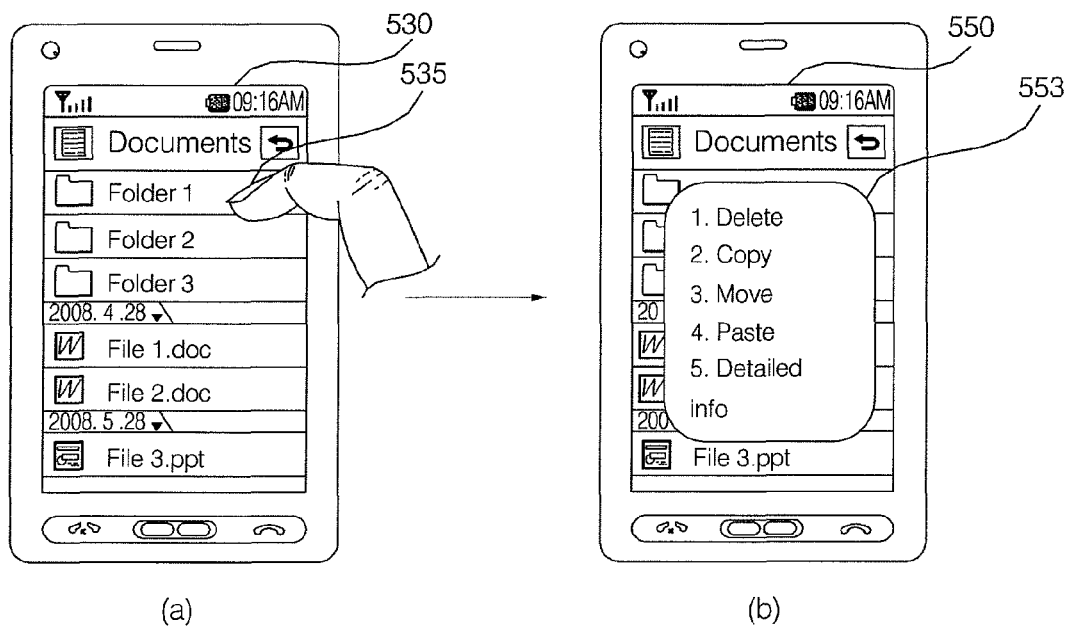
Figure 21:
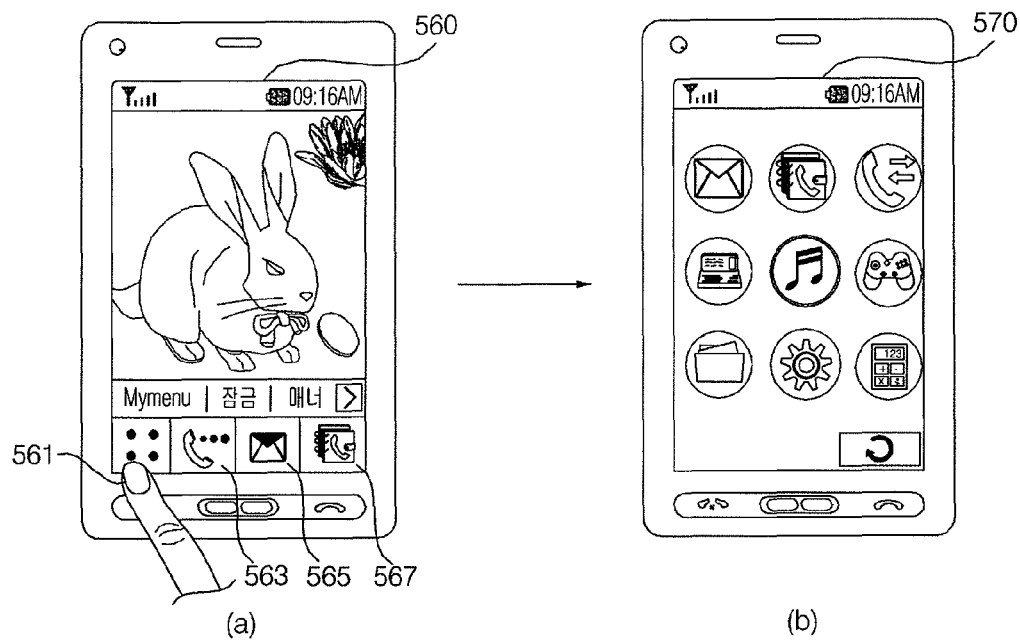
Figure 22:
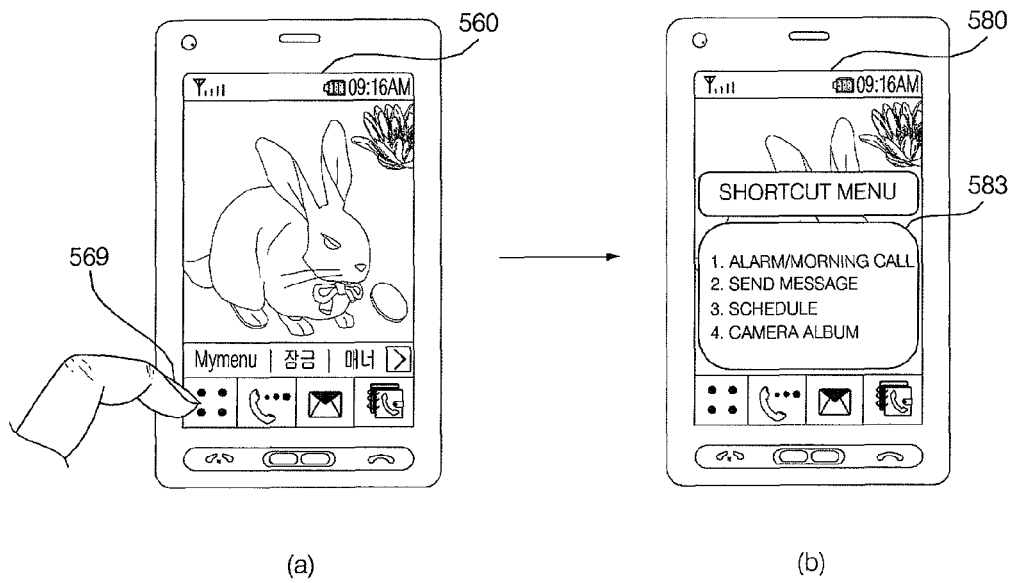
Figure 23:
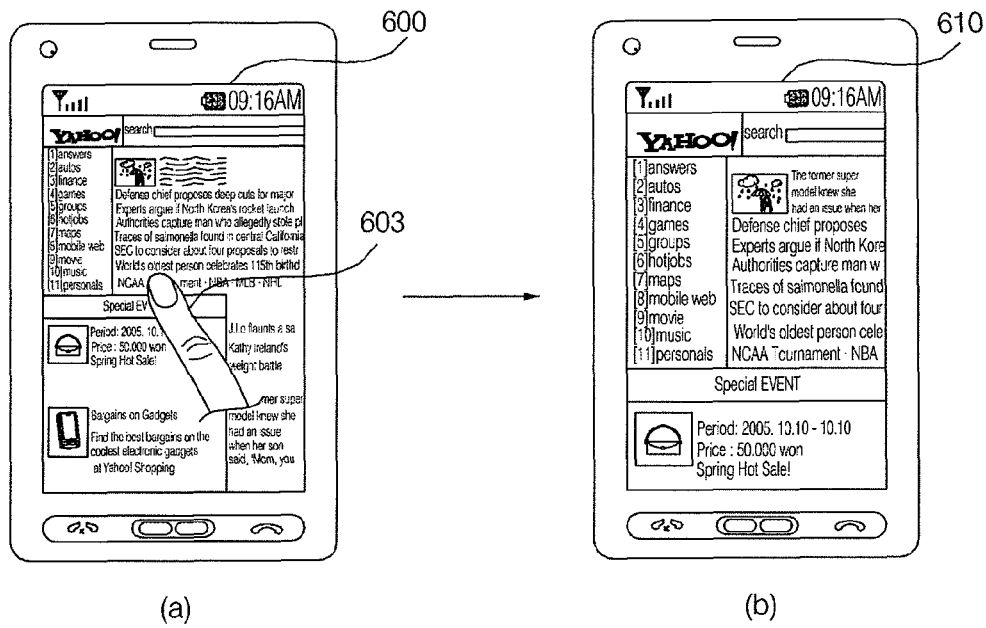
Figure 24:
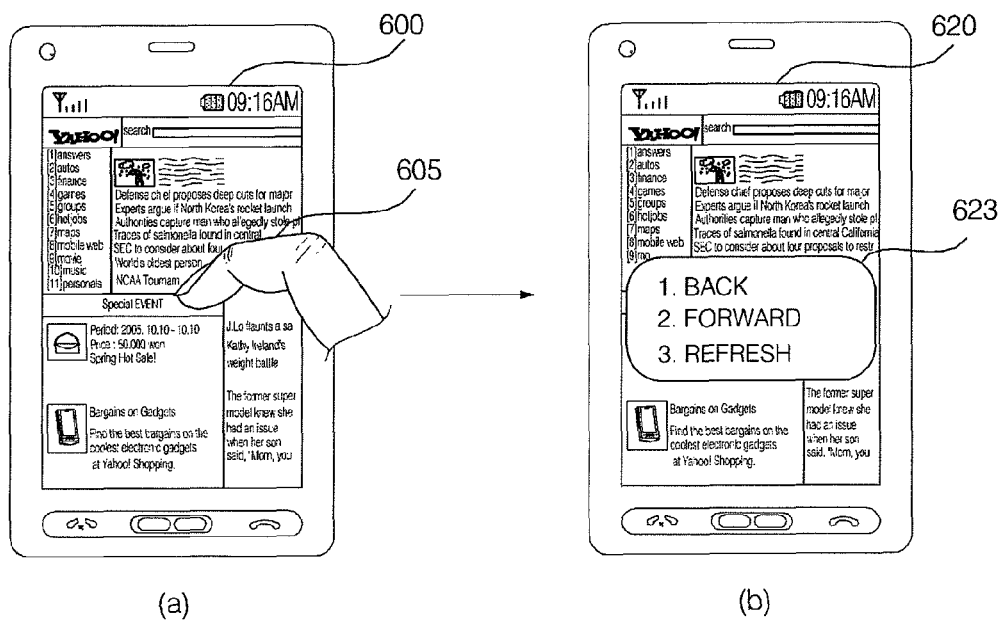
Figure 25:
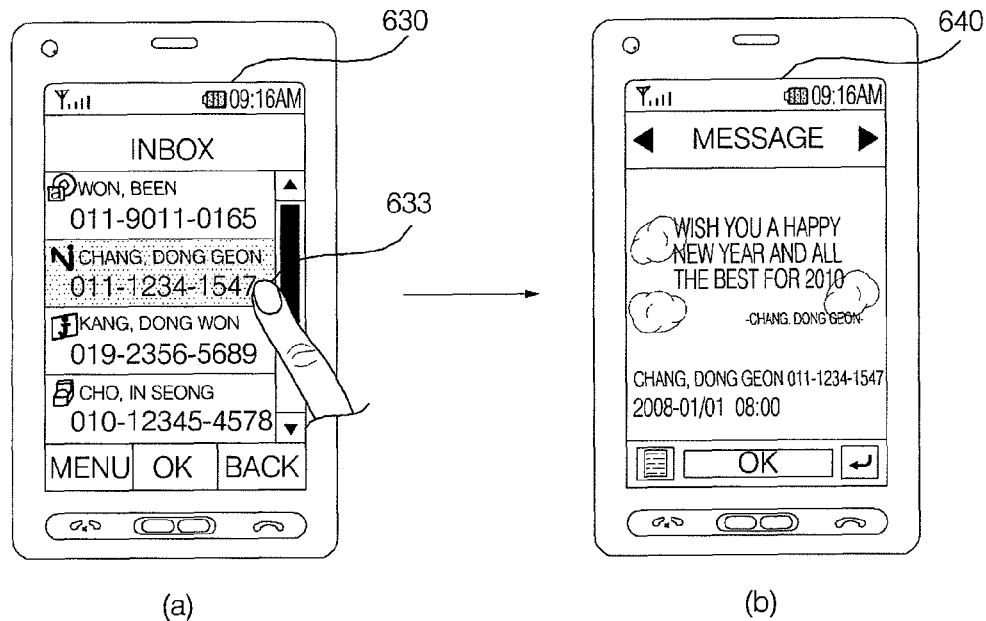
Figure 26:
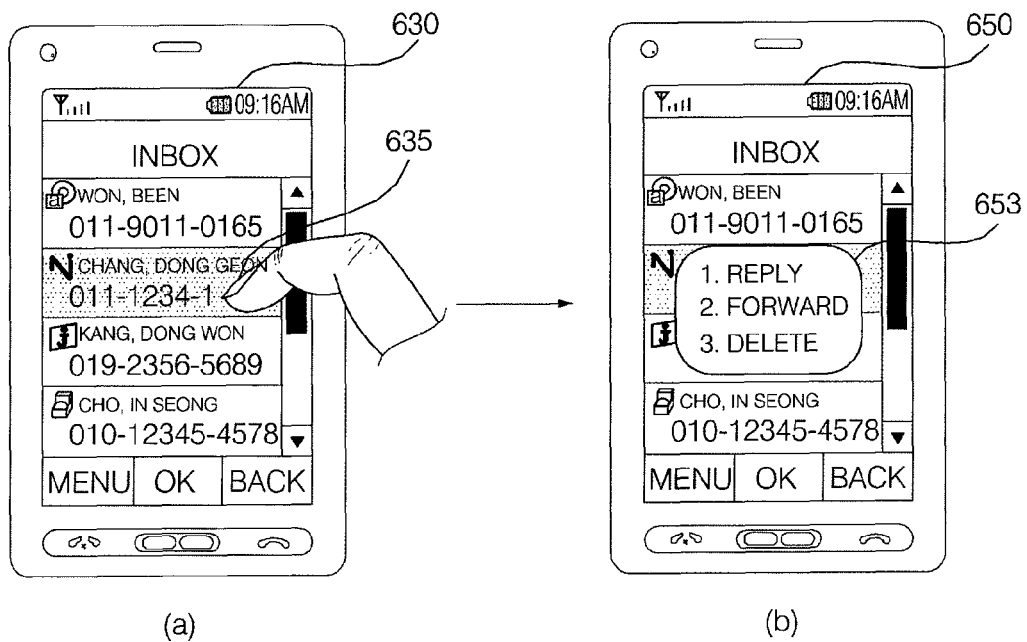

FIG. 16 illustrates a flowchart of a method of controlling the operation of a mobile terminal according to a ninth exemplary embodiment of the present invention. Referring to FIG. 16, the controller 180 may display an operation screen (e.g., a document viewer screen) corresponding to a current menu or a current operation on the display module 151 (S460).

Thereafter, if a fingernail touch and drag is detected from the operation screen (S462), the controller 180 may draw a line on the operation screen along a direction of the drag (S464). The controller 180 may provide a menu for selecting the color or thickness of the line.

If an ordinary touch and drag is detected from the operation screen (S466), the controller 180 may display the operation screen by an amount corresponding to the distance of the drag (S468).

If another user input such as a key input is received or an event occurs (S470), the controller 180 may control an operation corresponding to the received user input or the occurred event to be performed (S472). Operations S462 through S472 may be repeatedly performed until the user chooses to terminate the current operation menu (S474).

In this manner, it is possible to draw a line on a document viewer screen simply through a fingernail touch as if underlining or highlighting important phrases encountered during the reading of a book.

The first through ninth exemplary embodiments will hereinafter be described in further detail with reference to FIGS. 17 through 42.

FIGS. 17 through 26 illustrate how to perform different operations according to whether a fingernail touch or an ordinary touch is detected.

Referring to FIGS. 17(a) and 17(b), if a calculator icon is selected from a menu screen 500 by an ordinary touch 503, a calculator screen 510 corresponding to the calculator icon may be displayed.

On the other hand, referring to FIGS. 18(a) and 18(b), if the calculator icon is selected from the menu icon 500 by a fingernail touch 505, a shortcut menu 523 listing a number of commands relevant to a calculator mode may be displayed on the menu screen 500.

Referring to FIGS. 19(a) and 19(b), if one of a plurality of folders displayed on a contents search screen 530 is selected by an ordinary touch 533, a screen 540 showing the content of the selected folder may be displayed.

On the other hand, referring to FIGS. 20(a) and 20(b), if one of the folders displayed on the contents search screen 530 is selected by a fingernail touch 535, a shortcut menu 553 listing a number of commands (such as 'Delete' and 'Copy') relevant to the selected folder may be displayed.

In short, when an ordinary touch is detected, such a function as opening a folder or executing a file may be performed. On the other hand, when a fingernail touch is detected, such a function as displaying a shortcut menu listing a number of commands relevant to a folder or a file may be performed.

Referring to FIGS. 21(a) and 21(b), if a menu icon is selected from an idle screen 560 by an ordinary touch 561, an ordinary menu screen 570 may be displayed.

On the other hand, referring to FIGS. 22(a) and 22(b), if the menu icon is selected from the idle screen 560 by a fingernail touch 569, a shortcut menu 583 may be displayed as a popup window.

Referring to FIGS. 21(a) through 22(b), if a phone icon 563 is selected from the idle screen 560 by a fingernail touch, a video call function may be performed. On the other hand, if the phone icon 563 is selected from the idle screen 560 by an ordinary touch, a voice call function may be performed. More specifically, when the phone icon 563 is selected by a fingernail touch, a phone number list may be displayed. Then, if the user selects one of the phone numbers included in the displayed list and presses a 'send' key, a video call may be made to the selected phone number. Similarly, when the phone icon 563 is selected by an ordinary touch, an incoming/outgoing voice call list or a phone number list may be displayed. Then, if the user selects one of the callers/callees or the phone numbers included in the displayed list and presses the 'send' key, a voice call may be made to the selected caller/callee or the selected phone number. Alternatively, when the phone icon 563 is selected by a fingernail touch, one of a list of recent incoming/outgoing calls, a list of most frequent calls, a list of least frequent calls, and a list of shortcut numbers may be displayed. On the other hand, when the phone icon 563 is selected by an ordinary touch, a screen for entering a phone number to be dialed may be displayed.

Referring to FIGS. 21(a) through 22(b), if a message icon 565 is selected by a fingernail touch, a 'New Message' screen may be displayed. On the other hand, if the message icon 565 is selected by an ordinary touch, an 'Inbox' screen may be displayed. Alternatively, if the message icon 565 is selected by a fingernail touch, one of a list of shortcut numbers, a list of the senders of most recent messages, and a list of most frequent senders may be displayed. On the other hand, if the message icon 565 is selected by an ordinary touch, a 'Send Message' menu may be entered.

If a fingernail touch is detected from a search icon, one of a number of shortcut menu items associated with the search icon may be executed. On the other hand, if an ordinary touch is detected from the search icon, a search screen or a phonebook screen may be displayed. If a fingernail touch is detected from one of a number of items included in a thumbnail list or a file list, a shortcut function associated with the item from which the fingernail touch is detected may be performed. On the other hand, if an ordinary touch is detected from one of the items included in the thumbnail list or the file list, the item from which the ordinary touch is detected may simply be selected.

Referring to FIGS. 23(a) and 23(b), if an ordinary touch 603 is detected from a webpage screen 600, the webpage screen 610 may be enlarged.

On the other hand, referring to FIGS. 24(a) and 24(b), if a fingernail touch 605 is detected from the webpage screen 600, a shortcut menu 623 showing a number of commands relevant to the webpage screen 600 may be displayed on the webpage screen 600 as a popup window.

In short, the webpage screen 600 may be enlarged or reduced by an ordinary touch, and a browser shortcut menu may be displayed on the webpage screen 600 by a fingernail touch.

Referring to FIGS. 25(a) and 25(b), if one of a plurality of received text messages displayed on an 'Inbox' screen 630 is selected by an ordinary touch 633, a 'Text Message' screen 640 showing the content of the selected text message may be displayed.

On the other hand, referring to FIGS. 26(a) and 26(b), if one of the received text messages displayed on the 'Inbox' screen 630 is selected by a fingernail touch 635, a shortcut menu 653 showing a number of commands relevant to the selected text message may be displayed on the 'Inbox' screen 630.

In short, an ordinary touch may be treated as a click of the left button on the mouse, and a fingernail touch may be treated as a click of the right button on the mouse.

Different functions or operations may be performed according to whether a fingernail touch or an ordinary touch is detected during a voice/video call mode, an 'edit' mode, a camera mode, a phonebook mode, a contents search mode, a screen setting mode, a sound setting mode, a message mode, a text viewer mode, an electronic dictionary mode, a moving image player mode, an MP3 player mode, a broadcast mode, or an image preview mode. In addition, if a fingernail touch is detected when the mobile terminal 100 is locked, the mobile terminal 100 may be unlocked. Moreover, if a fingernail touch is detected from a widget, a widget easy setting menu may be displayed.

Figure 27:
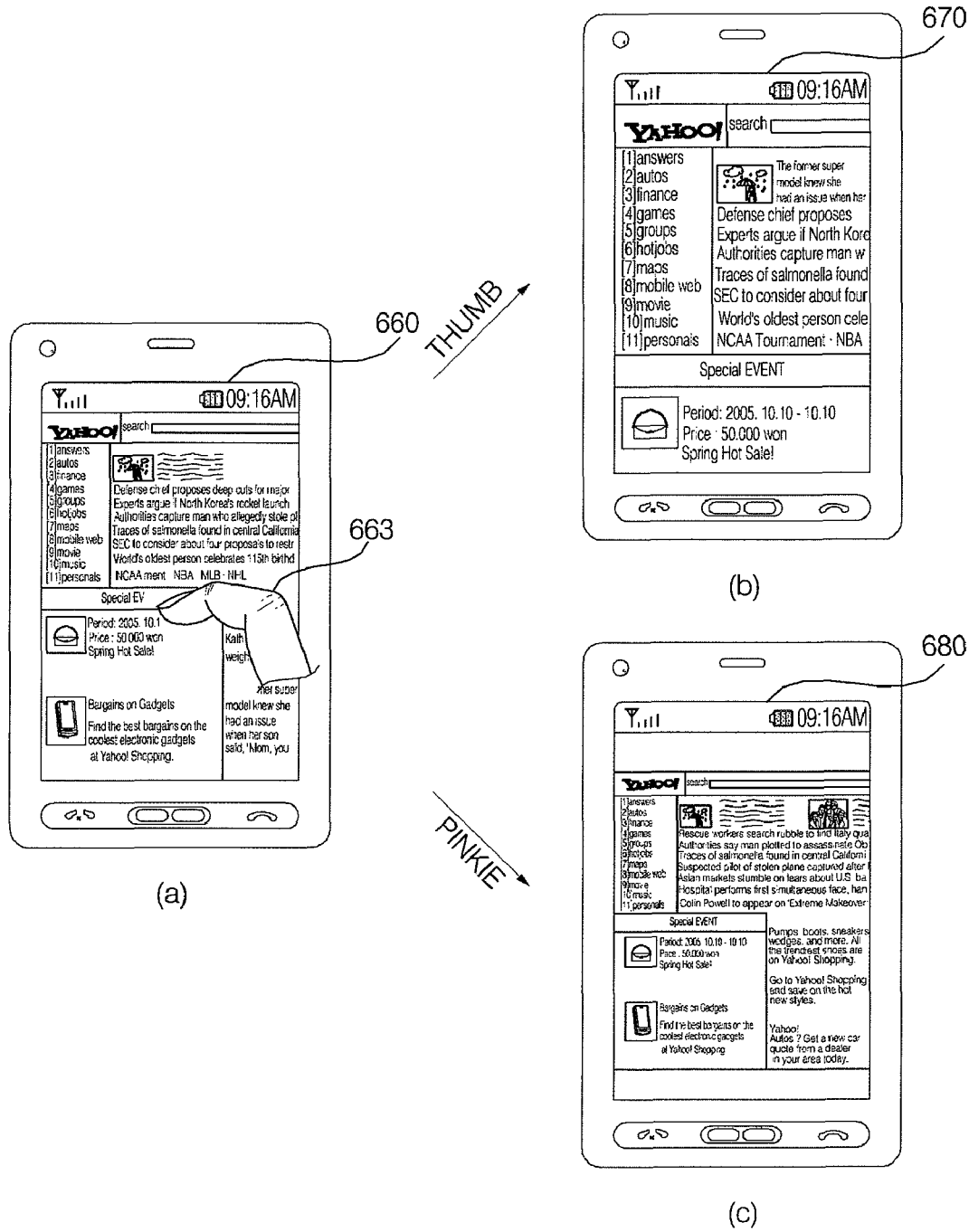
FIG. 27 illustrates how to perform different operations in response to different fingernail touches made by different fingers.

FIG. 27 illustrates how to perform different operations in response to different fingernail touches made by different fingers. Referring to FIGS. 27(a) and 27(b), if a fingernail touch made by a thumb is detected from a webpage screen 660, an enlarged webpage screen 670 of the webpage screen 660 may be displayed. On the other hand, if a fingernail touch made by a little finger is detected from the webpage screen 660, a reduced webpage screen 680 of the webpage screen 660 may be reduced.

In short, different control operations can be performed in response to different fingernail touches made by different fingers.

Figure 28:
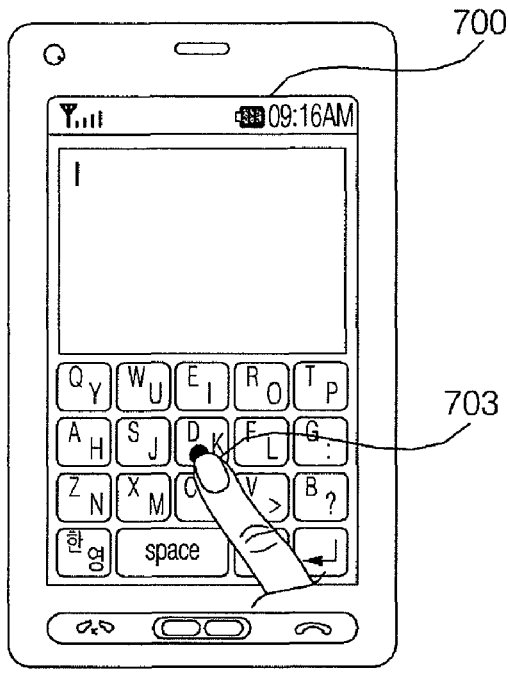
FIGS. 28 and 29 illustrate how to enter different characters in response to different fingernail touches made by different fingers.
Figure 29:
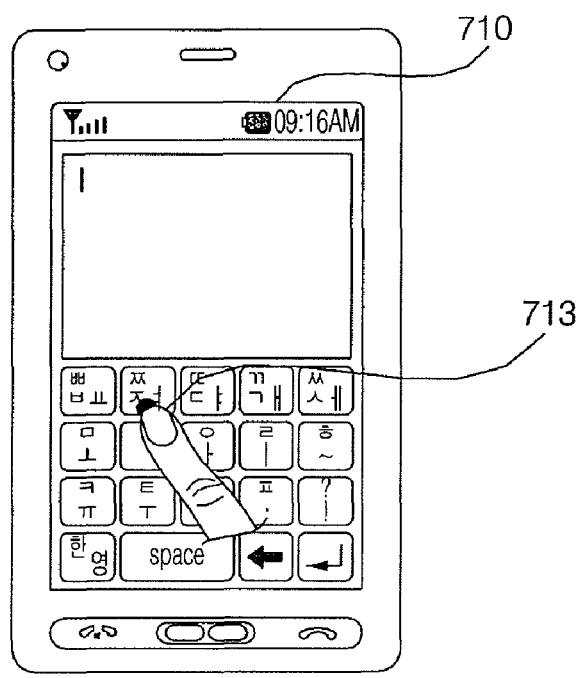

FIGS. 28 and 29 illustrate how to enter different characters in response to a fingernail touch.

Referring to FIG. 28, if a touch key 703 to which two alphabet letters, i.e., 'C' and 'D,' are allocated is selected from an alphabet letter input screen 700 by an ordinary or fingernail touch made by a left thumb, the alphabet letter C may be entered. If the touch key 703 is selected by an ordinary or fingernail touch made by a right thumb, the alphabet letter D may be entered.

Referring to FIG. 29, if a touch key 713 to which three Korean characters, i.e., first through third Korean characters, are allocated is selected from a Korean character input screen 710 by an ordinary or fingernail touch made by a thumb, the first Korean character may be entered. If the touch key 713 is selected by an ordinary or fingernail touch made by a middle finger, the second Korean character may be entered. If the touch key 713 is selected by an ordinary or fingernail touch made by a little finger, the third Korean character may be entered.

In this manner, if a touch key to which three characters are allocated is selected from a touch keypad screen or a qwerty touch keypad screen by an ordinary or fingernail touch, one of the three characters may be entered according to whether the ordinary or fingernail touch is made by an index finger, a middle finger or a little finger. Alternatively, if a touch key to which uppercase and lowercase forms of an alphabet letter are allocated is selected by an ordinary or fingernail touch, one of the uppercase and lowercase forms of the alphabet letter may be entered according to whether the ordinary or fingernail touch is made by a first or second finger. Still alternatively, when there is a touch key to which first and second alphabet letters are allocated, the first alphabet letter in upper case may be entered by an ordinary or fingernail touch made by a left index finger, the first alphabet letter in lower case may be entered by an ordinary or fingernail touch made by a left middle finger, the second alphabet letter in upper case may be entered by an ordinary or fingernail touch made by a right index finger, and the second alphabet letter in lower case may be entered by an ordinary or fingernail touch made by a right middle finger.

Similarly, when there is a touch key to which first through third characters are allocated, the first character may be entered by an ordinary or fingernail touch made by a first finger, the second character may be entered by an ordinary or fingernail touch made by a second finger and the third character may be entered by an ordinary or fingernail touch made by a third finger.

Figure 30:
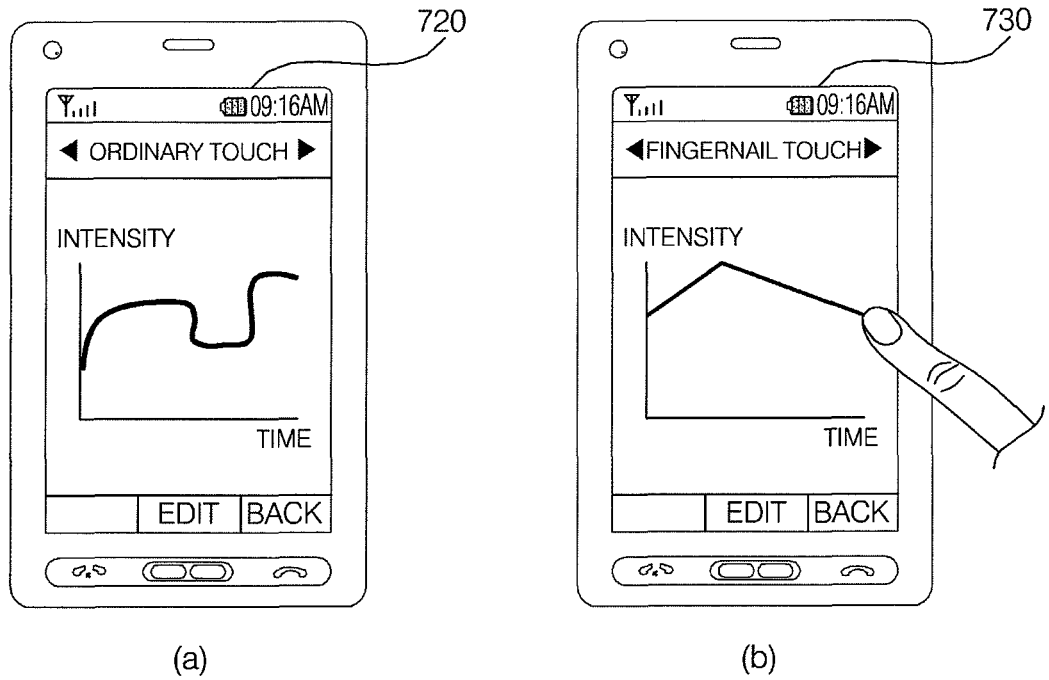
FIG. 30 illustrates how to set different vibration patterns or intensity levels for an ordinary touch and a fingernail touch.

FIG. 30 illustrates how to generate vibration with different patterns or intensities according to whether an ordinary touch or a fingernail touch is detected. Referring to FIG. 30, the user can arbitrarily set the type and pattern of a haptic effect (such as vibration) to be generated as feedback to an ordinary touch or a fingernail touch.

The user can also arbitrary set the type and pattern of a haptic effect to be generated as feedback to the execution of an operation menu or an operating mode or a change in the state of display of the mobile terminal 100.

Figure 31:
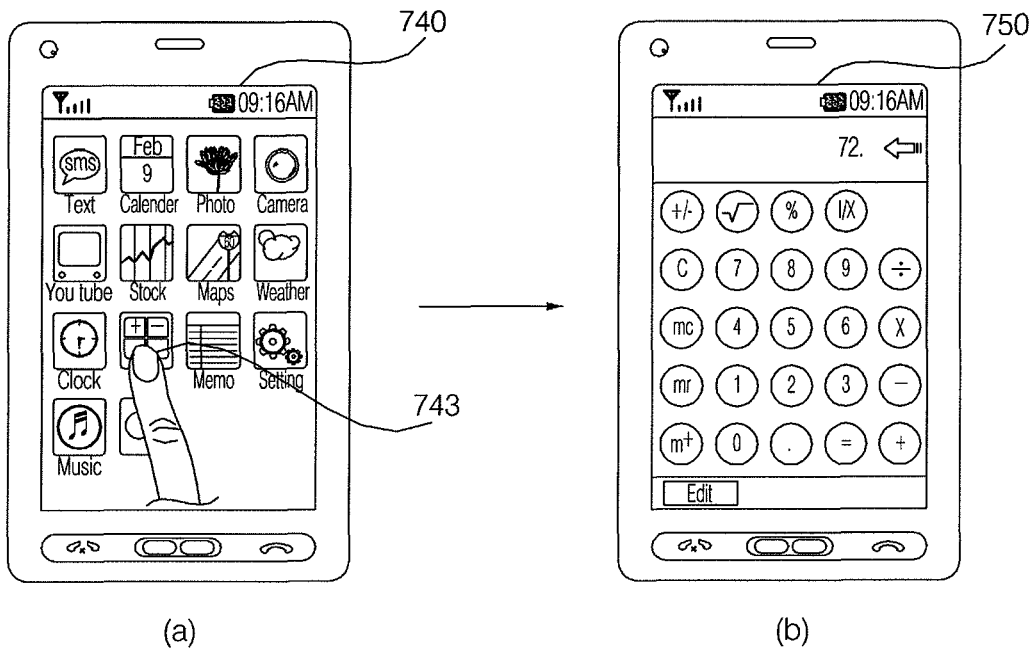
FIGS. 31 and 32 illustrate how to switch between various operating modes in response to a fingernail touch.
Figure 32:
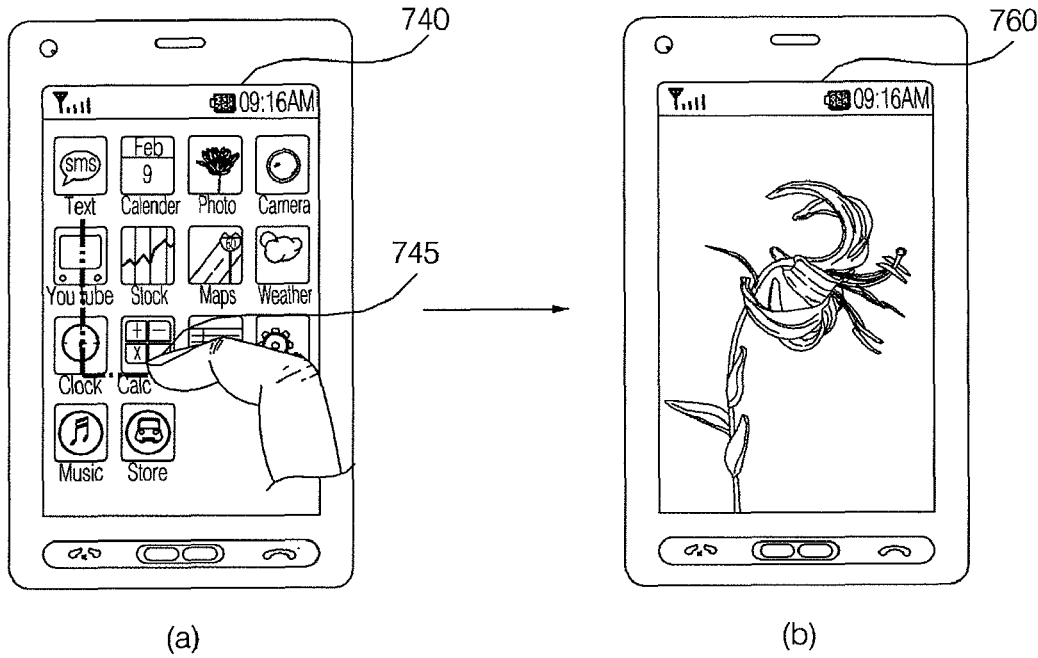

FIGS. 31 and 32 illustrate how to switch from one operating mode to another in response to a fingernail touch.

Referring to FIGS. 31(a) and 31(b), if a calculator icon is selected from a menu screen 740 by an ordinary touch 743, a calculator screen 750 may be displayed. That is, if an icon is selected by an ordinary touch, an operation corresponding to the icon may be performed.

On the other hand, referring to FIGS. 32(a) and 32(b), if a fingernail touch and drag 745 in an L-shaped motion is detected from the menu screen 740, the mobile terminal 100 may be locked, and a screen 760 indicating that the mobile terminal 100 is locked may be displayed.

Then, if a fingernail touch and drag in a U-shaped motion is detected from the menu screen 740, the mobile terminal 100 may be unlocked.

If a fingernail touch and drag in a question mark-shaped motion is detected from an idle screen, a help popup window showing the correspondence between a number of predefined fingernail touch patterns and a number of operating modes may be displayed.

Figure 33:
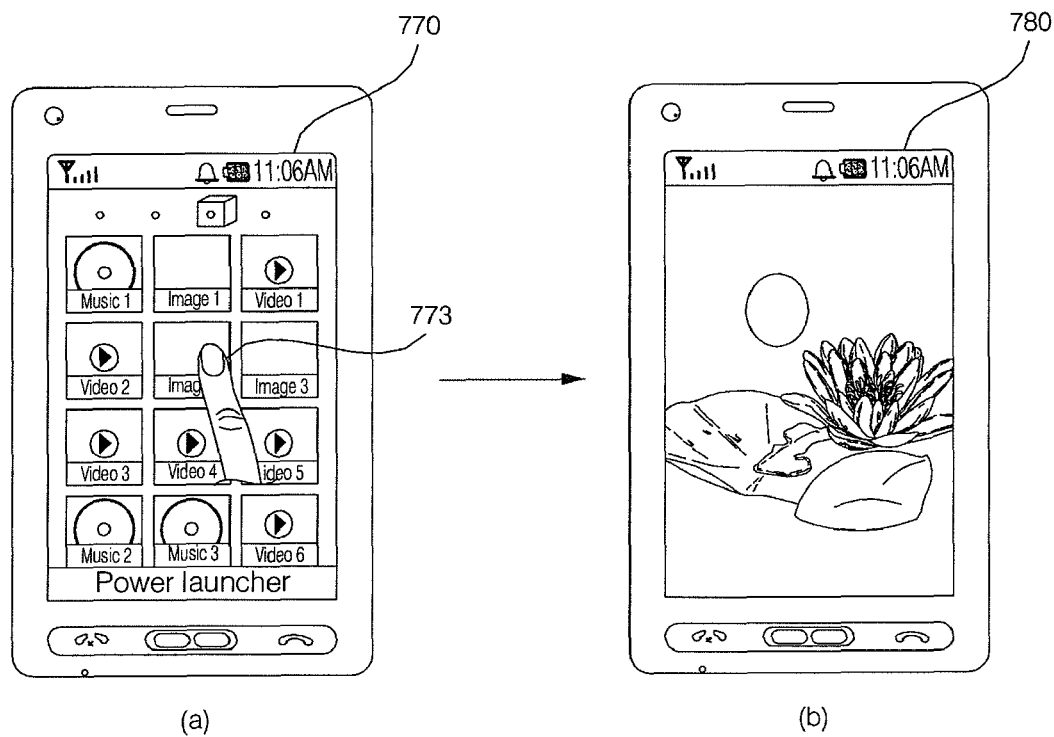
FIGS. 33 and 34 illustrate how to select a plurality of objects in response to a fingernail touch.
Figure 34:
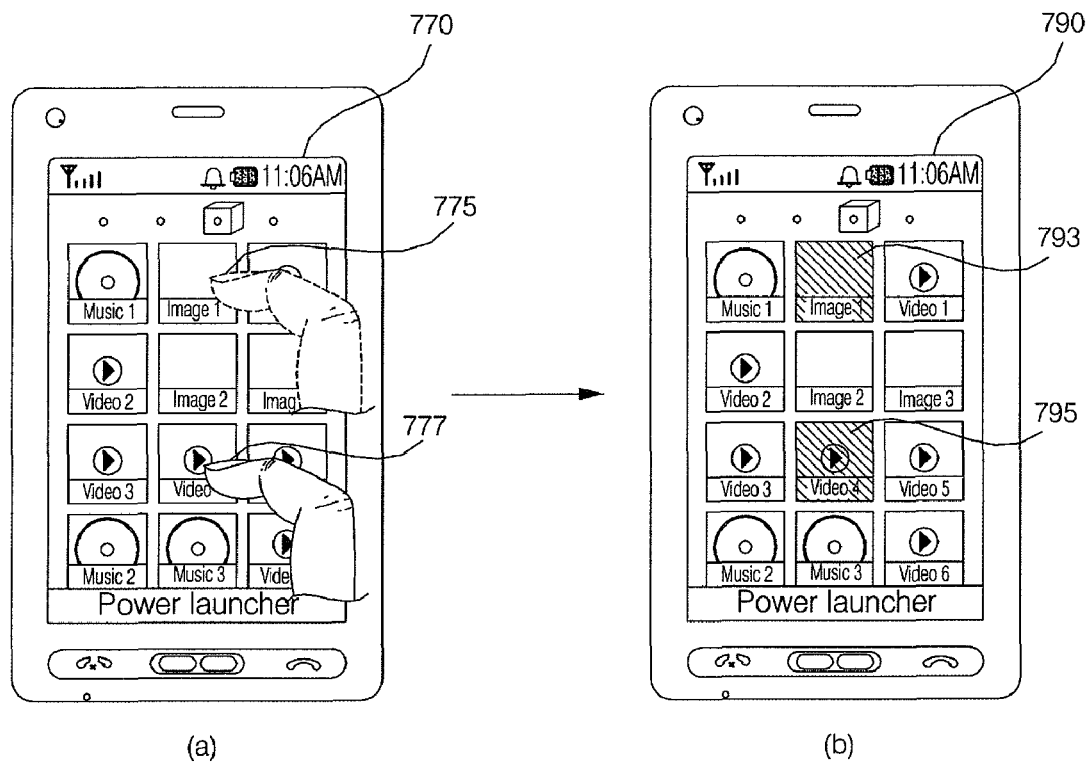

FIGS. 33 and 34 illustrate how to select one or more objects in response to a fingernail touch.

Referring to FIGS. 33(a) and 33(b), if a file is selected from a multimedia menu screen 770 by an ordinary touch 773, a screen 780 showing the content of the selected file may be displayed.

Referring to FIGS. 34(a) and 34(b), if two files are selected from the multimedia menu screen 770 by two fingernail touches 775 and 777, the selected two files may be displayed differently so as to be easily distinguishable from other non-selected files, and may then be able to be deleted, copied or edited in response to a user command.

If necessary, a plurality of objects can be selected at the same time by a fingernail touch and can be appropriately processed.

Figure 35:
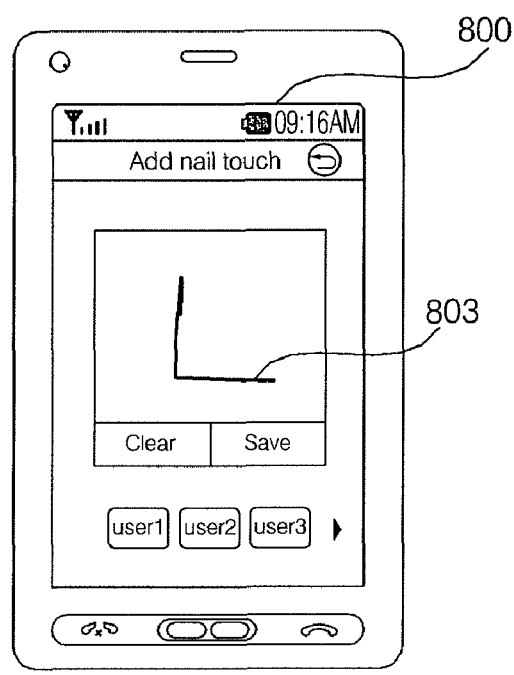
FIG. 35 illustrates an example of a menu for setting a fingernail touch pattern desired by a user.

FIG. 35 illustrates an example of a menu for setting a fingernail touch pattern desired by the user. Referring to FIG. 35, the user can set a desired fingernail touch pattern 803 using a menu screen 800. Once the fingernail touch pattern 803 is set, the user can set an operating mode to be entered by a fingernail touch with the fingernail touch pattern 803. A character or symbol may be set as the fingernail touch pattern 803. Alternatively, a series of two or more characters or symbols may be set as the fingernail touch pattern 803. The user can delete the fingernail touch pattern 803, if necessary.

Figure 36:
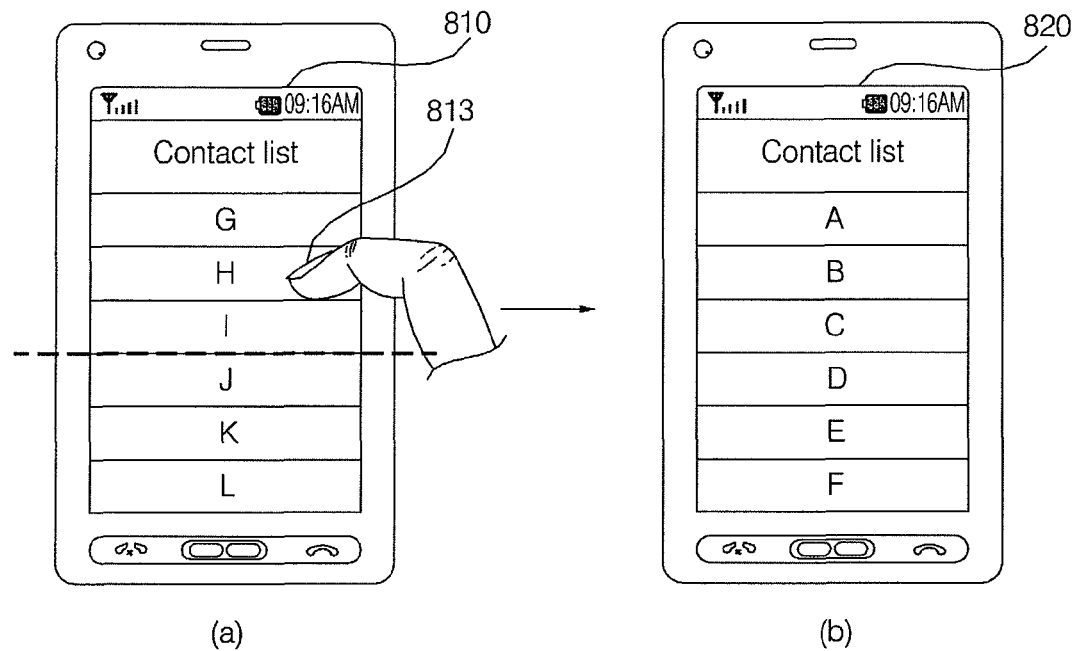
FIGS. 36 and 37 illustrate how to scroll a screen in response to a fingernail touch.
Figure 37:
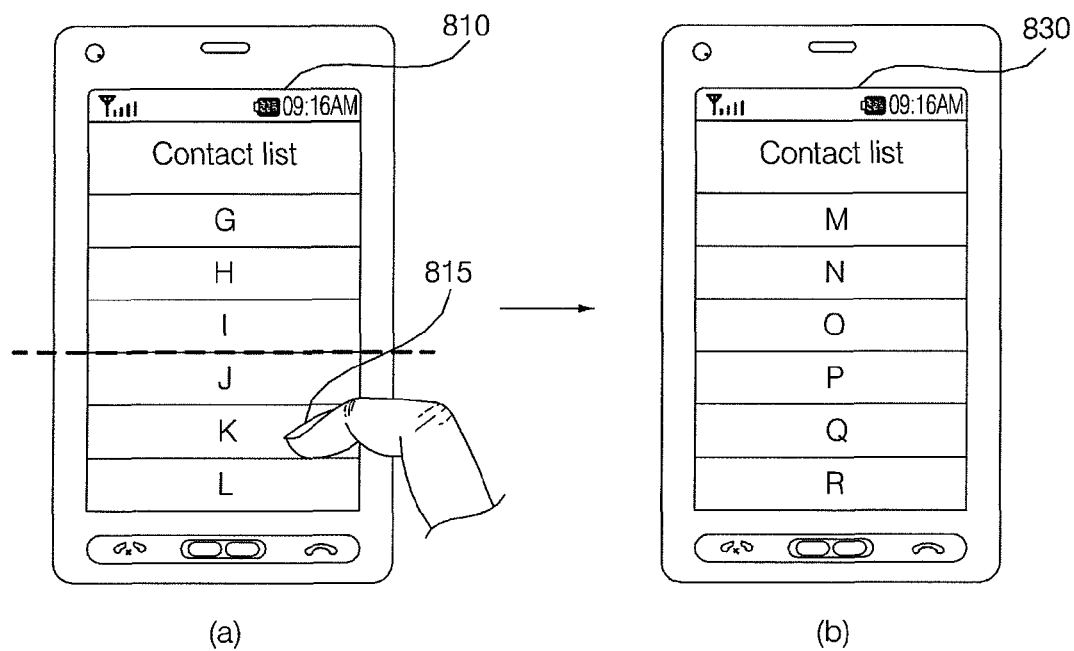

FIGS. 36 and 37 illustrate how to scroll a screen in response to a fingernail touch. Referring to FIGS. 36(a) and 36(b), if a fingernail touch 813 is detected from an upper half of a contact list screen 810 showing a plurality of items G through L in a contact list, the contact list may be scrolled up so that a plurality of items A through F that are followed by the plurality of items G through L in the contact list can appear on the contact list screen 810.

On the other hand, referring to FIGS. 37(a) and 37(b), if a fingernail touch 815 is detected from a lower half of the contact list screen 810, the contact list may be scrolled down so that a plurality of items M through R following the plurality of items G through L in the contact list can appear on the contact list screen 810.

In short, it is possible to easily scroll a screen via a fingernail touch.

Figure 38:
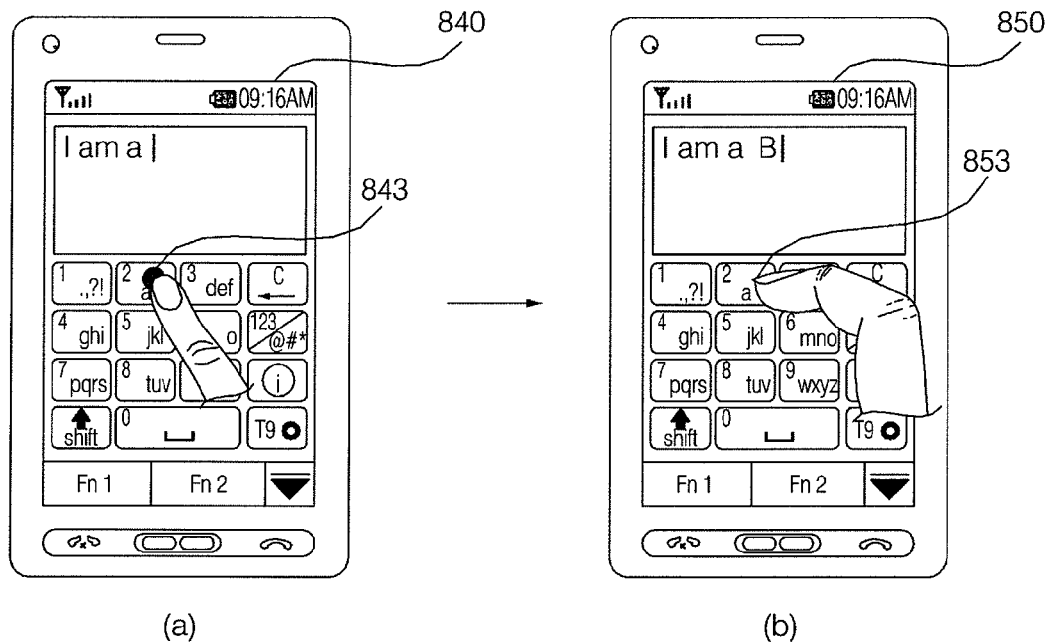
FIGS. 38 and 39 illustrate how to enter different characters according to whether an ordinary touch or a fingernail touch is detected.
Figure 39:
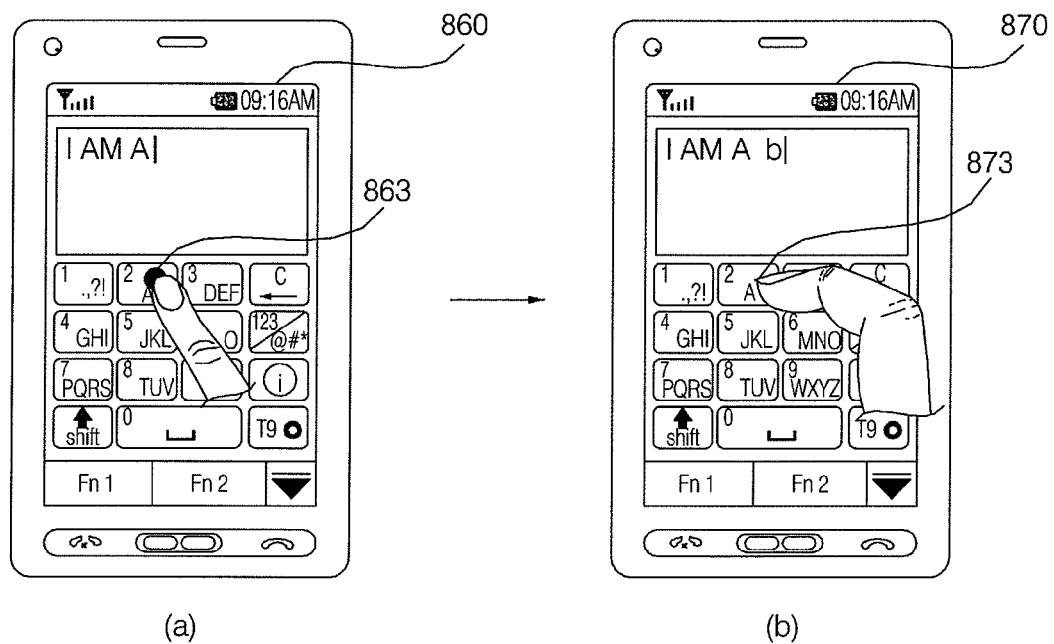

FIGS. 38 and 39 illustrate how to switch between different character input modes in response to a fingernail touch. Referring to FIG. 38(a), if a predetermined touch key is selected from a character input window displayed on a screen 840 by an ordinary touch 843 when a current character input mode is a lowercase input mode, a lowercase letter corresponding to the predetermined touch key may be entered. On the other hand, referring to FIG. 38(b), if the predetermined touch key is selected by a fingernail touch 853, an uppercase letter corresponding to the predetermined touch key may be entered even though the current character input mode is the lowercase input mode.

Similarly, referring to FIG. 39(a), if a predetermined touch key is selected from a character input window displayed on a screen 860 by an ordinary touch 863 when a current character input mode is an uppercase input mode, an uppercase letter corresponding to the predetermined touch key may be entered. On the other hand, referring to FIG. 39(b), if the predetermined touch key is selected by an ordinary touch 873, a lowercase letter corresponding to the predetermined touch key may be entered even though the current character input mode is the uppercase input mode.

Alternatively, when a long ordinary touch is detected, a character that can be entered in a current character input mode may be entered. On the other hand, if a long fingernail touch is detected, a character that can be entered in a different character input mode may be entered.

Figure 40:
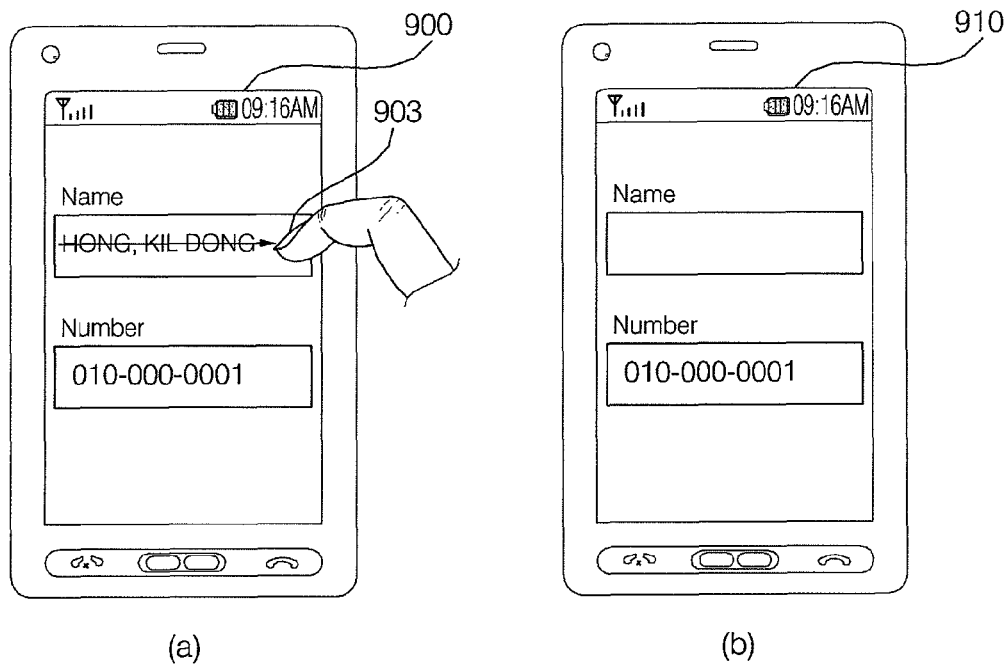
FIGS. 40 through 42 illustrate how to perform various functions in response to a fingernail touch and drag.
Figure 41:
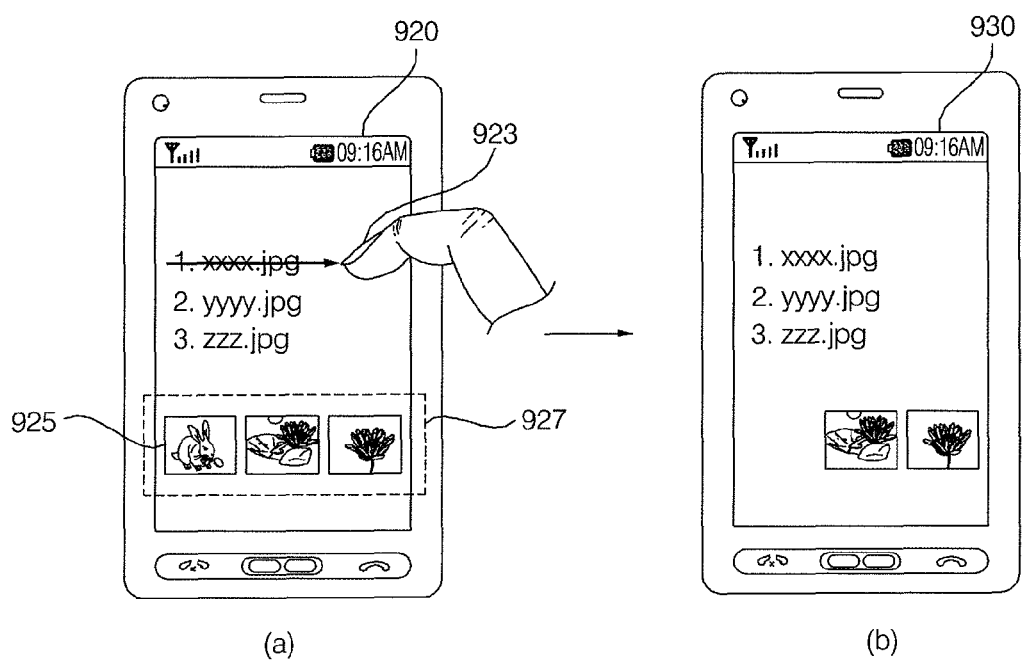
Figure 42:
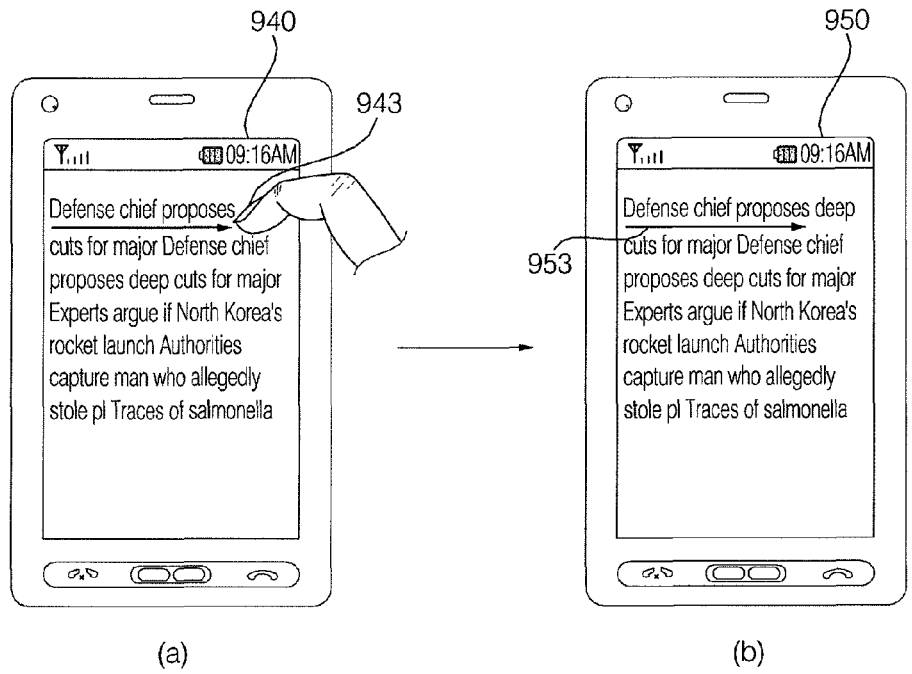

FIGS. 40 through 42 illustrate how to perform a variety of functions in response to a fingernail touch and drag. Referring to FIGS. 40(a) and 40(b), if a fingernail touch and drag 903 is detected from a 'Name' section on a phone number input screen 900, a name entered in the 'Name' section may be deleted.

Referring to FIGS. 41(a) and 41(b), if a fingernail touch and drag 923 is detected from one of a plurality of items displayed on a screen 920, one of a plurality of thumbnail images corresponding to the item from which the fingernail touch and drag 923 is detected may be deleted.

Referring to FIGS. 42(a) and 42(b), if a fingernail touch and drag 943 is detected from a document viewer screen 940, a line 953 may be drawn on the document viewer screen 940.

Figure 43:
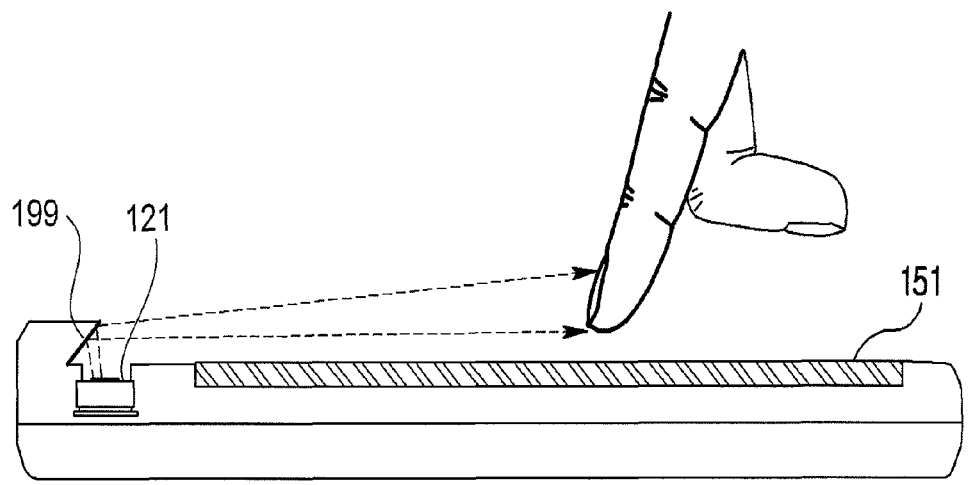
FIG. 43 is an overview of a mobile terminal detecting first and second finger characteristics of a finger touching a display according to an embodiment of the present invention.

Next, FIG. 43 is an overview of a mobile terminal detecting first and second finger characteristics of a finger touching a display according to an embodiment of the present invention. In FIG. 43, the camera 121 is a video camera used in video calls, for example. This is just one embodiment, and the camera 121 can be used to capture still or moving pictures. As shown in FIG. 43, the camera faces a user using the mobile terminal and is disposed adjacent to or near the touch screen display 151. A mirror 199 is also disposed near the camera 121 and reflects light emitted by the camera 121 so the camera 121 can capture images of the finger (or fingers) touching the display 151.

Thus, during an operation mode, the controller 180 can activate the camera 121 such that the camera 121 captures an image of the finger touching the touch screen display 151. The captured image is then examined by the controller 180 to determine finger characteristics of the finger or fingers touching the touch screen display 151. The finger characteristics can be how many fingers are touching the touch screen display 151, what finger or fingers are touching the touch screen display 151 (e.g., the left and right thumbs during text messaging, the left pinkie finger, the fingernail of the finger,), a fingernail touching the touch screen display 151, etc.

In one embodiment, the user can register finger characteristics before using the mobile terminal. For example, the user can operate the appropriate menus to capture different images of the their fingers, and then the controller 180 can determine different finger characteristics for the fingers and prompt the user to determine if the analysis is correct. In an alternative embodiment, and because fingers on different people exhibit similar characteristics, the controller 180 can automatically determine the finger characteristics based on known human finger characteristics without user intervention.

Thus, with reference to FIG. 43, the controller 180 can determine whether the user touches the touch screen display 151 with a fingernail, with two fingers, with two thumbs, etc. and then perform different operations based on the determined finger characteristics.

Various functions other than those set forth herein can be performed in response to a fingernail touch and drag.

The mobile terminal according to the present invention and the method of controlling the operation of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to differentiate an ordinary touch and a fingernail touch and thus to control various operations performed by a mobile terminal by using an ordinary touch, a fingernail touch or both. For example, it is possible to perform different operations or display different information in response to different fingernail touches made by different fingers. In addition, it is possible to switch between different operating modes or select more than one object at the same time in response to a fingernail touch. Moreover, it is possible to delete an object displayed on a screen or draw a line on a screen in response to a fingernail touch and drag.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   displaying, on a touch screen display of the mobile terminal, an operation screen corresponding to a current operating mode executing on the mobile terminal;
   detecting, via a detecting device, a touch input on the touch screen display of the mobile terminal;
   determining, via a controller on the mobile terminal, a first finger characteristic describing a finger touching the touch screen display and a second finger characteristic describing the finger touching the touch screen display that is different than the first finger characteristic;
   performing, via the controller, a first operation relevant to the current operating mode based on the determined first finger characteristic; and
   performing, via the controller, a second operation relevant to the current operating mode based on the determined second finger characteristic,
   wherein the first finger characteristic describes a fingernail of the finger touching the touch screen display and the second finger characteristic describes a portion of the finger not including the fingernail touching the touch screen display,
   wherein the displayed operation screen includes a plurality of selectable and executable items, and
   wherein when the determining step determines the fingernail is touching multiple items among the plurality of displayed items, the first operation includes selecting and distinctively displaying the selected items, and when the determining step determines the portion of the finger not including the fingernail is touching an item among the plurality of items, the second operation is executing the selected item and displaying a screen related to the executing item.

2. The method of claim 1, wherein the first finger characteristic is determined via a characteristic of the touch screen display changing when the finger touches the touch screen display, and the second finger characteristic is determined via image processing of an image captured of the finger touching the touch screen display.

3. The method of claim 1, wherein the first finger characteristic is determined via a characteristic of the touch screen display changing a first amount when the finger touches the touch screen display, and the second finger characteristic is determined via the characteristic of the touch screen display changing a second amount when the finger touches the touch screen display.

4. The method of claim 1, further comprising:
   generating a first haptic effect corresponding to the first operation; and
   generating a second haptic effect corresponding to the second operation and that is different than the first haptic effect.

5. A mobile terminal, comprising:
   a touch screen display configured to display an operation screen corresponding to a current operating mode executing on the mobile terminal;
   a detecting device configured to detect a touch input on the touch screen display of the mobile terminal; and
   a controller configured to determine a first finger characteristic describing a finger touching the touch screen display and a second finger characteristic describing the finger touching the touch screen display that is different than the first finger characteristic, to perform a first operation relevant to the current operating mode based on the determined first finger characteristic, and to perform a second operation relevant to the current operating mode based on the determined second finger characteristic,
   wherein the first finger characteristic describes a fingernail of the finger touching the touch screen display and the second finger characteristic describes a portion of the finger not including the fingernail touching the touch screen display,
   wherein the displayed operation screen includes a plurality of selectable and executable items, and
   wherein when the controller determines the fingernail is touching multiple items among the plurality of displayed items, the first operation includes selecting and distinctively displaying the selected items, and when the controller determines the portion of the finger not including the fingernail is touching an item among the plurality of items, the second operation is executing the selected item and displaying a screen related to the executing item.

6. The mobile terminal of claim 5, wherein the first finger characteristic is determined via a characteristic of the touch screen display changing when the finger touches the touch screen display, and the second finger characteristic is determined via image processing of an image captured of the finger touching the touch screen display.

7. The mobile terminal of claim 5, wherein the first finger characteristic is determined via a characteristic of the touch screen display changing a first amount when the finger touches the touch screen display, and the second finger characteristic is determined via the characteristic of the touch screen display changing a second amount when the finger touches the touch screen display.

8. The mobile terminal of claim 5, further comprising:
   a haptic module configured to generate a first haptic effect corresponding to the first operation, and to generate a second haptic effect corresponding to the second operation and that is different than the first haptic effect.

9. A mobile terminal, comprising:
   a touch screen display configured to display an operation screen corresponding to a current operating mode executing on the mobile terminal;
   a detecting device configured to detect a touch input on the touch screen display of the mobile terminal; and
   a controller configured to determine a first finger characteristic describing a finger touching the touch screen display and a second finger characteristic describing the finger touching the touch screen display that is different than the first finger characteristic, to perform a first operation relevant to the current operating mode based on the determined first finger characteristic, and to perform a second operation relevant to the current operating mode based on the determined second finger characteristic,
   wherein the first finger characteristic describes a fingernail of the finger touching the touch screen display and the second finger characteristic describes a portion of the finger not including the fingernail touching the touch screen display,
   wherein the displayed operation screens includes a plurality of selectable and executable items, and
   wherein when the controller determines the fingernail is being touched and dragged on the touch screen in a predetermined pattern, the first operation includes executing an application that corresponds to the pattern drawn by the fingernail touched and dragged on the touch screen, and when the controller determines the portion of the finger not including the fingernail is touching an item among the plurality of items, the second operation is executing the selected item and displaying a screen related to the executing item.

10. The mobile terminal of claim 9, wherein the controller is further configured to store in a memory a plurality of different fingernail patterns drawn on the touch screen and corresponding applications that are to be executed when one of the fingernail patterns is drawn on the touch screen.

* * * * *